United States Patent
Kubota et al.

(10) Patent No.: US 11,442,247 B2
(45) Date of Patent: Sep. 13, 2022

(54) IMAGING LENS

(71) Applicant: TOKYO VISIONARY OPTICS CO., LTD., Tokyo (JP)

(72) Inventors: Yoji Kubota, Nagano (JP); Kenichi Kubota, Tokyo (JP); Hitoshi Hirano, Tokyo (JP); Hisao Fukaya, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 0 days.

(21) Appl. No.: 17/017,797

(22) Filed: Sep. 11, 2020

(65) Prior Publication Data

US 2020/0409115 A1 Dec. 31, 2020

Related U.S. Application Data

(63) Continuation of application No. 16/165,182, filed on Oct. 19, 2018, now Pat. No. 10,935,767.

(30) Foreign Application Priority Data

Dec. 12, 2017 (JP) ............................ JP2017-237736

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
None
See application file for complete search history.

(56) References Cited

U.S. PATENT DOCUMENTS

| | | |
|---|---|---|
| 9,964,739 B1 | 5/2018 | Shi |
| 2014/0118844 A1 | 5/2014 | Tsai et al. |
| 2015/0198786 A1 | 7/2015 | Liao et al. |
| 2015/0241659 A1 | 8/2015 | Huang |
| 2016/0085055 A1 | 3/2016 | Asami |
| 2016/0147044 A1 | 5/2016 | Kondo |
| 2017/0153419 A1* | 6/2017 | Hsieh ..................... G02B 13/06 |
| 2017/0269342 A1 | 9/2017 | Jung et al. |
| 2017/0276909 A1 | 9/2017 | Jung et al. |
| 2018/0011293 A1* | 1/2018 | Hsueh ....................... G02B 9/62 |
| 2018/0011294 A1* | 1/2018 | Lai .......................... G02B 5/208 |
| 2018/0203207 A1* | 7/2018 | Chen ................... G02B 13/0045 |
| 2018/0239113 A1 | 8/2018 | Dai |
| 2018/0314039 A1 | 11/2018 | Dai |
| 2020/0103630 A1* | 4/2020 | Wu ..................... G02B 13/0045 |

FOREIGN PATENT DOCUMENTS

JP 2017-037119 A 2/2017

* cited by examiner

*Primary Examiner* — Darryl J Collins
(74) *Attorney, Agent, or Firm* — Hamre, Schumann, Mueller & Larson, P.C.

(57) ABSTRACT

An imaging lens includes a first lens having negative refractive power; an aperture stop; a second lens; a third lens; a fourth lens having negative refractive power; a fifth lens; and a sixth lens, arranged in this order from an object side to an image plane side. The fifth lens is formed in a shape so that a surface thereof on the object side is convex at a paraxial region thereof. The sixth lens is formed in a meniscus shape at a paraxial region thereof. The first lens and the sixth lens have specific Abbe's numbers.

17 Claims, 21 Drawing Sheets

IMAGING LENS

CROSS-REFERENCE TO RELATED APPLICATIONS

This is a continuation application of a prior application Ser. No. 16/165,182, filed on Oct. 19, 2018, pending.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in an onboard camera, a smartphone, a cellular phone, a digital camera, a digital video camera, a network camera, a TV conference camera, a fiber scope, and a capsule endoscope.

In these years, some vehicles are equipped with a plurality of cameras for improving safety and/or convenience. For example, as a camera to support safely backing a vehicle, there is a backup camera. For example, in case of a vehicle equipped with a backup camera, a view behind the vehicle is displayed on a monitor upon backing the vehicle. Since a driver can visually see an object even if the object is invisible due to shadow behind the vehicle, the driver can safely back the vehicle without hitting an obstacle. Such a camera for mounting in a vehicle, so-called "onboard camera", is expected to be continuously in more demand.

Such onboard cameras may be mounted in relatively small spaces, such as a back door, a front grille, a side mirror, and interior space thereof. For this reason, an imaging lens for mounting in an onboard camera is strongly required to have a compact size, in addition to attaining a high resolution suitable for a higher pixel count of an imaging element and a wide angle of view to achieve a wider range of an image. However, when the downsizing of the imaging lens is attempted, each lens has strong refractive power, and it is often difficult to satisfactorily correct aberrations. Upon actual designing of an imaging lens, it is a key to achieve those multiple requirements such as satisfactory correction of aberrations, a wider angle of view, and downsizing in a balanced manner.

On the other hand, in place of cellular phones that are intended mainly for making phone calls, so-called "smartphones, i.e., multifunctional cellular phones which can run various application software as well as a voice call function, have been more widely used. The product lineup of smartphones is very wide including beginner models to high-end models, and is often categorized by performance of hardware, optical performance of a camera, etc. Among those high-end models, there is a model that is intended to have new added value by being equipped with two imaging lenses. For example, in case of a model having an imaging lens with a wide angle of view as well as a conventional imaging lens with a typical angle of view, images from those two imaging lenses are synthesized by processing software so as to achieve smooth zooming in and zooming out. In case of those imaging lenses for such a purpose, similarly to the imaging lenses of the onboard camera, it is required to have a smaller size of the imaging lens, as well as satisfactory correction of aberrations and a wider angle of view.

For example, as the conventional imaging lens having a wide angle of view, an imaging lens described in Patent Reference has been known.

PATENT REFERENCE

Patent Reference: Japanese Patent Application Publication No. 2017-037119

The conventional imaging lens described in Patent Reference includes a first lens, a second lens, a third lens, a stop, a fourth lens, a fifth lens, and a sixth lens arranged in the order from an object side. The first lens has a concave surface on an image plane side and has negative refractive power. The second lens is a meniscus lens directing a concave surface thereof to the object side. The third lens has a biconvex shape near the optical axis and has positive refractive power. The fourth lens has negative refractive power, and the fifth lens has positive refractive power. The sixth lens has at least one aspheric surface. In general, when an imaging lens is designed to have a wide angle, the first lens tends to have a large outer shape. In this point, according to the conventional imaging lens of Patent Reference, while having a wide angle, the enlargement of the first lens is restricted and the field curvature is satisfactorily corrected.

According to the conventional imaging lens disclosed in Patent Reference, although the number of the lenses that composes the conventional imaging lens is as small as six, the angle of view is wide and aberrations are relatively satisfactorily corrected. However, since the total length of the lens system is increased, the imaging lens does not satisfy the requirements of downsizing in these days. Further, it is difficult to satisfy both a small size of the imaging lens and satisfactory correction of aberrations. Here, such a problem is not specific to the imaging lens to be mounted in onboard cameras and smartphones. Rather, it is a common problem for an imaging lens to be mounted in a relatively small camera such as cellular phones, digital cameras, digital video cameras, network cameras, TV conference cameras, fiber scopes, and capsule endoscopes.

In view of the above-described problems in the conventional techniques, an object of the present invention is to provide an imaging lens that can attain a wider angle of view and satisfactory correction of aberrations, while achieving a small size.

Further objects and advantages of the present invention will be apparent from the following description of the invention.

SUMMARY OF THE INVENTION

In order to attain the objects described above, according to a first aspect of the present invention, an imaging lens includes a first lens, a second lens, a third lens, a fourth lens, a fifth lens, and a sixth lens in the order from an object side to an image plane side. The first lens has negative refractive power. The second lens has positive refractive power. The third lens has positive refractive power. The fourth lens has negative refractive power. The sixth lens has negative refractive power. The fourth lens and the fifth lens are disposed so as to face each other. An image plane-side surface of the fourth lens is formed in a concave shape at the peripheral portion thereof. An object-side surface of the fifth lens is formed in a concave shape at the peripheral portion thereof.

In attaining a wider angle of view of the imaging lens, correction of a field curvature and a distortion is especially important. According to the imaging lens of the present invention, the refractive power of the four lenses is arranged in a well-balanced manner such as negative-positive-positive-negative in the order from the object side. Accordingly, the aberrations generated in the first lens are suitably corrected by two lenses having positive refractive power and the fourth lens having negative refractive power. In addition, according to the imaging lens of the present invention, the fourth lens is formed in a shape such that an image plane side surface thereof is concave at the peripheral portion thereof. Moreover, the fifth lens, arranged facing the fourth lens, is formed in a shape such that an object side surface thereof is concave at the peripheral portion thereof. With such shapes of the fourth lens and the fifth lens, it is achievable to downsize the imaging lens and to satisfactorily correct the field curvature and the distortion.

When a composite focal length of the first lens, the second lens, the third lens and the fourth lens is F1, the imaging lens having the above-described configuration preferably satisfies the following conditional expression (1):

$$0<F1 \quad (1)$$

When the imaging lens of the present invention satisfies the conditional expression (1), it is achievable to downsize the imaging lens and to satisfactorily correct an astigmatism, the distortion, and the chromatic aberration. When the composite focal length F1 is outside the range of the conditional expression (1) and is negative, the composite refractive power of the fifth lens and the sixth lens is positive and the refractive power is strong. Therefore, it is difficult to downsize the imaging lens. In addition, the distortion increases in the negative direction and the astigmatic difference increases. An axial chromatic aberration is excessively corrected (a focal position at a short wavelength moves to the image plane side relative to a focal position at a reference wavelength), and a chromatic aberration of magnification is insufficiently corrected (an image-forming point at a short wavelength is close to the optical axis relative to an image-forming point at a reference wavelength). For this reason, it is difficult to obtain satisfactory image-forming performance.

When the composite focal length of the fifth lens and the sixth lens is F2, the imaging lens having the above-described configuration preferably satisfies the following conditional expression (2):

$$F2<0 \quad (2)$$

When the imaging lens satisfies the conditional expression (2), it is achievable to satisfactorily correct the astigmatism and the distortion, while downsizing the imaging lens. When the value of the composite focal length F2 is outside the range of the conditional expression (2), it is advantageous for correction of distortion, but it is difficult to downsize the imaging lens. In addition, a sagittal image surface of the astigmatism curves to the object side, the astigmatic difference increases, and it is difficult to correct the field curvature. Therefore, it is difficult to obtain satisfactory image-forming performance.

According to the imaging lens having the above-described configuration, it is preferred to dispose an aperture stop between the first lens and the second lens. Here, in this specification, "between the first lens and the second lens" means between a tangential plane of a vertex of the object-side surface of the first lens and a tangential plane of a vertex of the image plane-side surface of the second lens. Disposing the aperture stop in such a position, it is achievable to suitably restrain an incident angle of a light beam emitted from the imaging lens to the image plane of the imaging element within the range of chief ray angle (CRA) and to satisfactorily correct aberrations.

When the whole lens system has the focal length f and a distance on the optical axis between the first lens and the second lens is D12, the imaging lens having the above-described configuration preferably satisfies the following conditional expression (3):

$$0.05<D12/f<0.8 \quad (3)$$

When the imaging lens satisfies the conditional expression (3), it is achievable to satisfactorily correct the chromatic aberration, the field curvature, and the astigmatism. When the value exceeds the upper limit of "0.8", although it is advantageous for correction of the chromatic aberration of magnification, the sagittal image surface of the astigmatism curves to the image plane side and the astigmatic difference increases. In addition, the image-forming surface curves to the image plane side and the field curvature is excessively corrected. On the other hand, when the value is below the lower limit of "0.05", the chromatic aberration of magnification is excessively corrected (the image-forming point at a short wavelength moves in a direction to be away from the optical axis relative to the image-forming point at a reference wavelength), and the sagittal image surface of the astigmatism curves to the object side and the astigmatic difference increases. In addition, the image-forming surface curves to the object side, and the field curvature is insufficiently corrected. Therefore, in either case, it is difficult to obtain satisfactory image-forming performance.

When the whole lens system has the focal length f and a distance on the optical axis between the second lens and the third lens is D23, the imaging lens having the above-described configuration preferably satisfies the following conditional expression (4):

$$0.001<D23/f<0.3 \quad (4)$$

When the value satisfies the conditional expression (4), it is achievable to satisfactorily correct the chromatic aberration, the field curvature, and the astigmatism. When the value exceeds the upper limit of "0.3", the chromatic aberration of magnification is excessively corrected and the sagittal image surface of the astigmatism curves to the image plane side and the astigmatic difference increases. In addition, the field curvature is excessively corrected, so that it is difficult to obtain satisfactory image-forming performance. On the other hand, when the value is below the lower limit of "0.001", the axial chromatic aberration is excessively corrected and the astigmatic difference increases. Therefore, also in this case, it is difficult to obtain satisfactory image-forming performance.

When the distance on the optical axis between the first lens and the second lens is D12 and the distance on the optical axis between the second lens and the third lens is D23, the imaging lens having the above-described configuration preferably satisfies the following conditional expression (5):

$$2<D12/D23<30 \quad (5)$$

When the imaging lens satisfies the conditional expression (5), it is achievable to satisfactorily correct the distortion, the field curvature, and the astigmatism, while downsizing the imaging lens. When the value exceeds the upper limit of "30", it is difficult to downsize the imaging lens and the distortion increases in the negative direction. In addition, the sagittal image surface of the astigmatism curves to the image plane side, and the astigmatic difference increases. The field curvature is excessively corrected. On the other hand, when the value is below the lower limit of "2", the sagittal image surface of the astigmatism curves to the object side, and the astigmatic difference increases. Therefore, in either case, it is difficult to obtain satisfactory image-forming performance.

When the second lens has a focal length f2 and the third lens has a focal length f3, the imaging lens having the above-described configuration preferably satisfies the following conditional expression (6):

$$0.5<f2/f3<3 \quad (6)$$

When the imaging lens satisfies the conditional expression (6), it is achievable to satisfactorily correct the astigmatism and the field curvature, while downsizing the imaging lens. When the value exceeds the upper limit of "3", it is difficult to downsize the imaging lens. In addition, the sagittal image surface of the astigmatism curves to the image plane side, so that the astigmatic difference increases and the field curvature is excessively corrected. Therefore, it is difficult to obtain satisfactory image-forming performance. On the other hand, when the value is below the lower limit of "0.5", it is advantageous for downsizing of the imaging lens. However, the astigmatic difference increases and the field curvature is insufficiently corrected. Therefore, it is difficult to obtain satisfactory image-forming performance.

When the whole lens system has a focal length f and a composite focal length of the second lens and the third lens is f23, the imaging lens having the above-described configuration preferably satisfies the following conditional expression (7):

$$0.2<f23/f<1 \quad (7)$$

When the imaging lens satisfies the conditional expression (7), it is achievable to satisfactorily correct the chromatic aberration, the astigmatism, the distortion, and the field curvature, while suitably restraining the incident angle of a light beam emitted from the imaging lens to the image plane within the range of CRA. When the value exceeds the upper limit of "1", although it is advantageous for correction of the chromatic aberration, the distortion increases in the negative direction. In addition, the sagittal image surface of astigmatism curves to the object side, the astigmatic difference increases. On the other hand, when the value is below the lower limit of "0.2", the axial chromatic aberration and the chromatic aberration of magnification are both excessively corrected. In addition, the sagittal image surface of the astigmatism curves to the image plane side, so that the astigmatic difference increases and the field curvature is excessively corrected. Therefore, in either case, it is difficult to obtain satisfactory image-forming performance.

In order to correct the aberrations more satisfactorily, the imaging lens having the above-described configuration preferably satisfies the following conditional expression (7A):

$$0.2<f23/f<0.8 \quad (7A)$$

When the first lens has Abbe's number v1, the second lens has Abbe's number v2, and the third lens has Abbe's number v3, the imaging lens having the above-described configuration preferably satisfies the following conditional expressions (8) through (10):

$$40<v1<75 \quad (8)$$

$$40<v2<75 \quad (9)$$

$$40<v3<75 \quad (10)$$

When the imaging lens satisfies the conditional expressions (8) through (10), it is achievable to satisfactorily correct the chromatic aberration. When the three lenses from the object side are formed of low-dispersion materials, it is achievable to suitably restrain generation of the chromatic aberration in the imaging lens. When the value exceeds the upper limit of "75", although it is advantageous for correction of the axial chromatic aberration, the chromatic aberration of magnification excessively corrected. Therefore, it is difficult to obtain satisfactory image-forming performance. On the other hand, when the value is below the lower limit of "40", although it is advantageous for correction of the chromatic aberration of magnification, the axial chromatic aberration is excessively corrected. Therefore, also in this case, it is difficult to obtain satisfactory image-forming performance.

When the whole lens system has a focal length f and the fourth lens has a focal length f4, the imaging lens having the above-described configuration preferably satisfies the following conditional expression (11):

$$-4<f4/f<-0.4 \quad (11)$$

When the imaging lens satisfies the conditional expression (11), it is achievable to satisfactorily correct the chromatic aberration, the astigmatism, and the field curvature, while suitably restraining the incident angle of a light beam emitted from the imaging lens to the image plane within the range of CRA. When the imaging lens satisfies the upper limit of "−0.4", it is difficult to restrain the incident angle emitted from the imaging lens to the image plane within the range of CRA. In addition, the axial chromatic aberration and the chromatic aberration of magnification are both excessively corrected and the sagittal image surface of the astigmatism curves to the image plane side so that the astigmatic difference increases. On the other hand, when the value is below the lower limit of "−4", while it is easy to restrain the incident angle of the light beam to the image plane within the range of CRA, the sagittal image surface of the astigmatism curves to the object side and the astigmatic difference increases. Therefore, in either case, it is difficult to obtain satisfactory image-forming performance.

According to the imaging lens having the above-described configuration, the fifth lens is preferably formed in an aspheric shape such that both the object-side surface and the image plane-side surface thereof have an inflection point. With such a shape of the fifth lens, it is achievable to suitably restrain the incident angle of a light beam emitted from the imaging lens to the image plane within the range of CRA.

According to the imaging lens having the above-described configuration, the sixth lens is preferably formed in an aspheric shape such that the image plane-side surface thereof has an inflection point. With such a shape of the sixth lens, it is achievable to more suitably restrain the incident angle of a light beam emitted from the imaging lens to the image plane within the range of CRA.

When the whole lens system has the focal length f and a distance on the optical axis between the fourth lens and the fifth lens is D45, the imaging lens having the above-described configuration preferably satisfies the following conditional expression (12):

$$0.15<D45/f<0.4 \quad (12)$$

When the imaging lens satisfies the conditional expression (12), it is achievable to satisfactorily correct the chromatic aberration and the astigmatism, while downsizing the imaging lens. When the imaging lens satisfies the conditional expression (12), it is achievable to suitably restrain the incident angle of a light beam emitted from the imaging lens to the image plane within the range of CRA. When the value exceeds the upper limit of "0.4", while it is easy to restrain the incident angle of the light beam to the image plane within the range of CRA, the astigmatic difference increases. In addition, the chromatic aberration of magnification is excessively corrected, and it is it is difficult to obtain satisfactory image-forming performance. On the other hand, when the value is below the lower limit of "0.15", while it is advantageous to downsize the imaging lens, it is difficult to restrain the incident angle of the light beam within the range of CRA. In addition, the astigmatic difference and the axial chromatic aberration increase. Therefore, it is difficult to obtain satisfactory image-forming performance.

When the distance on the optical axis between the fourth lens and the fifth lens is D45 and the distance on the optical axis from the object-side surface of the first lens to the image plane-side surface of the sixth lens is L16, the imaging lens having the above-described configuration preferably satisfies the following conditional expression (13):

$$0.05 < D45/L16 < 0.25 \tag{13}$$

When the imaging lens satisfies the conditional expression (13), it is achievable to satisfactorily correct the chromatic aberration and the astigmatism, while downsizing the imaging lens. When the imaging lens satisfies the conditional expression (13), it is achievable to suitably restrain the incident angle of a light beam emitted from the imaging lens to the image plane within the range of CRA. When the value exceeds the upper limit of "0.25", while it is easy to restrain the incident angle of the light beam to the image plane within the range of CRA, the astigmatic difference increases. In addition, the chromatic aberration of magnification is excessively corrected, and it is it is difficult to obtain satisfactory image-forming performance. On the other hand, when the value is below the lower limit of "0.05", while it is advantageous to downsize the imaging lens, it is difficult to restrain the incident angle of the light beam within the range of CRA. In addition, the astigmatic difference and the axial chromatic aberration increase. Therefore, it is difficult to obtain satisfactory image-forming performance.

When the image plane side surface of the fourth lens has an effective diameter $\Phi 4B$ and the object side surface of the fifth lens has an effective diameter $\Phi 5A$, the imaging lens having the above-described configuration preferably satisfies the following conditional expression (14):

$$1 < \Phi 5A/\Phi 4B < 2 \tag{14}$$

When the imaging lens satisfies the conditional expression (14), it is achievable to suitably restrain the incident angle of a light beam emitted from the imaging lens to the image plane within the range of CRA, while achieving small size and a wide angle of view of the imaging lens. When the value exceeds the upper limit of "2", a difference between the effective diameter $\Phi 4B$ and the effective diameter $\Phi 5A$ is large, and the incident angle of the light beam emitted from the imaging lens to the image plane is large. Therefore, it is difficult to restrain the incident angle within the range of CRA. On the other hand, when the value is below the lower limit of "1", while it is easy to restrain the incident angle within the range of CRA, it is difficult to achieve small size and a wide angle of view of the imaging lens.

When the whole lens system has a focal length f and the sixth lens has a focal length f6, the imaging lens having the above-described configuration preferably satisfies the following conditional expression (15):

$$-5 < f6/f < -0.5 \tag{15}$$

When the imaging lens satisfies the conditional expression (15), it is achievable to satisfactorily correct the astigmatism and the distortion, while downsizing the imaging lens. When the imaging lens satisfies the conditional expression (15), it is achievable to suitably restrain the incident angle of a light beam emitted from the imaging lens to the image plane within the range of CRA. When the value exceeds the upper limit of "−0.5", although it is advantageous for downsizing of the imaging lens, the astigmatic difference increases. Therefore, it is difficult to obtain satisfactory image-forming performance. On the other hand, when the value is below the lower limit of "−5", it is easy to restrain the incident angle of the light beam to the image plane within the range of CRA. However, the sagittal image surface of the astigmatism curves to the object side, so that the astigmatic difference increases. Therefore, it is difficult to obtain satisfactory image-forming performance.

When the sixth lens has Abbe's number ν6, the imaging lens having the above-described configuration preferably satisfies the following conditional expression (16):

$$10 < \nu 6 < 40 \tag{16}$$

When the imaging lens satisfies the conditional expression (16), it is achievable to satisfactorily correct the chromatic aberration. When the value exceeds the upper limit of "40", although it is easy to correct the axial chromatic aberration, the chromatic aberration of magnification is excessively corrected. Therefore, it is difficult to obtain satisfactory image-forming performance. On the other hand, when the value is below the lower limit of "10", the axial chromatic aberration is excessively corrected and the chromatic aberration of magnification increases. For this reason, it is difficult to obtain satisfactory image-forming performance.

When the distance on the optical axis between the first lens and the second lens is D12 and the distance on the optical axis between the fifth lens and the sixth lens is D56, the imaging lens having the above-described configuration preferably satisfies the following conditional expression (17):

$$D56 < D12 \tag{17}$$

When the imaging lens satisfies the conditional expression (17), it is achievable to satisfactorily correct the astigmatism, while downsizing the imaging lens. When the value is outside the range of the conditional expression (17), it is advantageous for downsizing of the imaging lens. However, the sagittal image surface of the astigmatism curves to the object side, and the astigmatic difference increases and the field curvature is insufficiently corrected. Therefore, it is difficult to obtain satisfactory image-forming performance.

When the whole lens system has the focal length f and the distance on the optical axis between the fifth lens and the sixth lens is D56, the imaging lens having the above-described configuration preferably satisfies the following conditional expression (18):

$$0.03 < D56/f < 0.3 \tag{18}$$

When the imaging lens satisfies the conditional expression (18), it is achievable to satisfactorily correct the astigmatism and the chromatic aberration of magnification. When the value exceeds the upper limit of "0.3", although it is easy to correct the astigmatism, the chromatic aberration of magnification increases. On the other hand, when the value is below the lower limit of "0.03", although it is advantageous to correct the chromatic aberration of magnification, the astigmatism increases at the peripheral portion thereof. Therefore, in either case, it is difficult to obtain satisfactory image-forming performance.

When the thickness of the fifth lens on the optical axis is T5 and the thickness of the sixth lens on the optical axis is T6, the imaging lens having the above-described configuration preferably satisfies the following conditional expression (19):

$$0.5 < T5/T6 < 3.5 \quad (19)$$

When the imaging lens satisfies the conditional expression (19), it is achievable to satisfactorily correct the field curvature and the astigmatism. When the value exceeds the upper limit of "3.5", the field curvature is excessively corrected. In addition, the sagittal image surface of the astigmatism tilts to the image plane side and the astigmatic difference increases. On the other hand, when the value is below the lower limit of "0.5", the field curvature is insufficiently corrected and the astigmatism increases. Therefore, in either case, it is difficult to obtain satisfactory image-forming performance.

When the object-side surface of the first lens has an effective diameter $\Phi 1A$ and the image plane-side surface of the sixth lens has an effective diameter $\Phi 6B$, the imaging lens having the above-described configuration preferably satisfies the following conditional expression (20):

$$\Phi 1A < \Phi 6B \quad (20)$$

The object-side surface of the first lens disposed closest to the object side may be exposed to the most severe environment, such as exposure to liquid, e.g., water. In case of a conventional wide-angle imaging lens, typically, the first lens is large. Therefore, when such conventional imaging lens is mounted in a vehicle for an onboard camera, the size could be an issue. Moreover, on an object-side surface of the first lens, an optical thin film may be frequently formed so as to attain environmental resistance. When the imaging lens satisfies the conditional expression (20), it is achievable to reduce an exposed area of the first lens, which contacts with surrounding environment. With the small diameter of the first lens, it is achievable to reduce the cost of the optical thin film, which in turn reduces the manufacturing cost of the imaging lens.

When the distance on the optical axis from the object-side surface of the first lens to the image plane is La and the maximum image height of the image plane is Hmax, the imaging lens having the above-described configuration preferably satisfies the following conditional expression (21):

$$0.4 < La/H\,max < 1.8 \quad (21)$$

In case of an imaging lens to be mounted in a thin smartphone or the like, it is necessary to hold the imaging lens within a limited space. Therefore, the total length of the imaging lens is strictly limited. Furthermore, as the angle of view of the imaging lens is wider, it is important not merely to have a small size but also to make the ratio of the total length of the imaging lens to the size of the image plane as small as possible, i.e., how to achieve low profile is important. When the imaging lens satisfies the conditional expression (21), it is possible to attain low profile of the imaging lens. Here, between the imaging lens and the image plane, typically, there is often disposed an insert such as an infrared cut-off filter and cover glass. In this specification, for the distance on the optical axis of those inserts, an air conversion length is employed.

According to the present invention, the respective lenses from the first lens to the sixth lens are preferably disposed with certain air intervals. When the respective lenses are disposed at certain air intervals, the imaging lens of the present invention can have a lens configuration that does not contain any cemented lens. In such lens configuration like this, since it is easy to form all of the six lenses that compose the imaging lens from plastic materials, it is achievable to suitably restrain the manufacturing cost of the imaging lens.

Recently, an imaging element with high pixel count is more frequently combined with an imaging lens for a purpose of improving performance of a camera. In case of such an imaging element with a high pixel count, a light-receiving area of each pixel decreases, so that an image tends to be dark. As a method of correcting the darkness of the image, there is a method of improving light-receiving sensitivity of the imaging element by using an electrical circuit. However, when the light-receiving sensitivity increases, a noise component, which does not directly contribute to formation of an image, is also amplified. Therefore, it is necessary to have another circuit to reduce the noise. Accordingly, in order to obtain fully bright image without such electrical circuit, when the whole lens system has the focal length f and the imaging lens has a diameter of entrance pupil Dep, the imaging lens having the above-described configuration preferably satisfies the following conditional expression (22):

$$f/\text{Dep} < 2.5 \quad (22)$$

According to the present invention, when the imaging lens has an angle of view $2\omega$, the imaging lens preferably satisfies $100° \leq 2\omega$. When the imaging lens satisfies this conditional expression, it is possible to attain a wide angle of the imaging lens and it is achievable to suitably attain both downsizing and the wide angle of the imaging lens.

According to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Therefore, "an object-side surface having a positive curvature radius" means the object-side surface is a convex surface. "An object-side surface having a negative curvature radius" means the object side surface is a concave surface. In addition, "an image plane-side surface having a positive curvature radius" means the image plane-side surface is a concave surface. "An image plane-side surface having a negative curvature radius" means the image plane-side surface is a convex surface. Here, a curvature radius used herein refers to a paraxial curvature radius, and may not fit to general shapes of the lenses in their sectional views all the time.

According to the imaging lens of the present invention, it is achievable to provide an imaging lens having a wide angle of view, which is especially suitable for mounting in a small-sized camera, while having high resolution with satisfactory correction of aberrations.

DETAILED DESCRIPTION OF PREFERRED EMBODIMENTS

Figure 1:
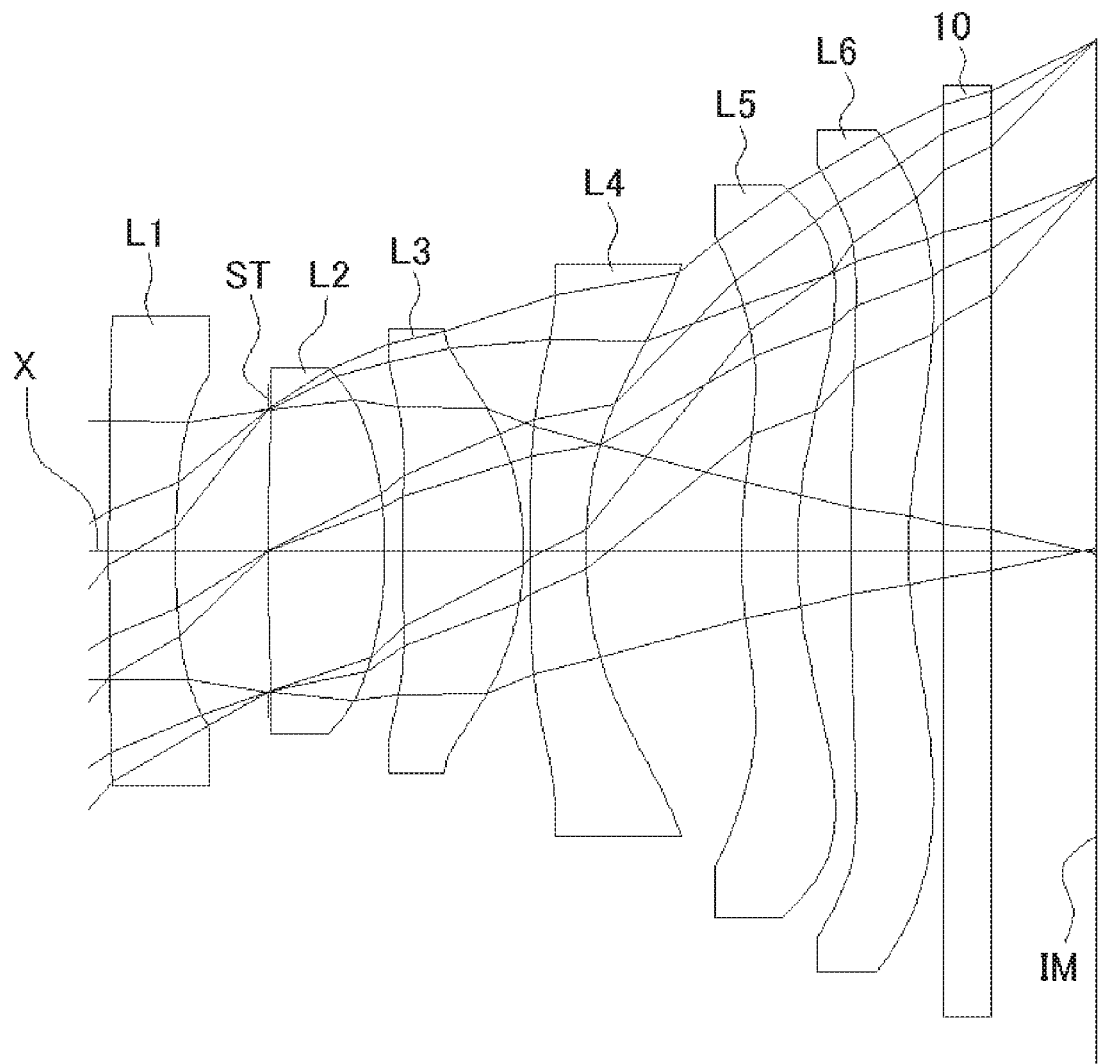
FIG. 1 is a sectional view showing a schematic configuration of an imaging lens in Numerical Data Example 1 of the present invention.

Hereunder, referring to the accompanying drawings, an embodiment of the present invention will be fully described.

FIGS. 1, 4, 7, 10, 13, 16, and 19 are schematic sectional views of the imaging lenses in Numerical Data Examples 1 to 7 according to the embodiment, respectively. Since the imaging lenses in those Numerical Data Examples have the same basic configuration, the lens configuration of the embodiment will be described with reference to the illustrative sectional view of Numerical Data Example 1.

The imaging lens of the embodiment includes a first lens L1 having negative refractive power; a second lens L2 having positive refractive power; a third lens L3 having positive refractive power; a fourth lens L4 having negative refractive power; a fifth lens L5, and a sixth lens L6 having negative refractive power, arranged in the order from an object side. The fourth lens L4 and the fifth lens L5 are disposed to face each other. Between the first lens L1 and the second lens L2, there is disposed an aperture stop ST. In addition, between the sixth lens L6 and an image plane IM of an imaging element, there is provided a filter 10. The filter 10 is omissible.

The first lens L1 is formed in a shape such that a curvature radius r1 of a surface thereof on the object-side and a curvature radius r2 of a surface thereof on the image plane side are both positive, so as to have a shape of a meniscus lens directing a convex surface thereof to the object side near an optical axis. The shape of the first lens L1 may not be limited to the one in Numerical Data Example 1. The first lens L1 can be formed in a shape such that the curvature radius r1 is negative and the curvature radius r2 is positive, so as to have a shape of a biconcave lens near the optical axis. The first lens L1 can be formed in any shape as long as the curvature radius r2 of the image plane side surface thereof is positive.

The second lens L2 is formed in a shape such that a curvature radius r4 of a surface thereof on the object-side is positive and a curvature radius r5 of a surface thereof on the image plane side is negative, so as to have a shape of a biconvex lens near the optical axis. The shape of the second lens L2 may not be limited to the one in Numerical Data Example 1. The second lens L2 can be formed in a shape of a meniscus lens directing a convex surface thereof to the object side near the optical axis, or can be formed in a shape of a meniscus lens directing a concave surface thereof to the object side near the optical axis.

The third lens L3 is formed in a shape such that a curvature radius r6 of a surface thereof on the object-side is positive and a curvature radius r7 of a surface thereof on the image plane side is negative, so as to have a shape of a biconvex lens near the optical axis. The shape of the third lens L3 may not be limited to the one in Numerical Data Example 1. For example, the third lens L3 can be formed in a shape such that the curvature radius r6 and the curvature radius r7 are both negative, so as to have a shape of a meniscus lens directing a concave surface thereof to the object side near the optical axis. The third lens L3 of Numerical Data Example 6 is an example of a shape of a meniscus lens directing a concave surface thereof to the object side near the optical axis.

The fourth lens L4 is formed in a shape such that a surface thereof on the image plane side is concave at the peripheral portion thereof. According to the imaging lens of Numerical Data Example 1, the fourth lens L4 is formed in a shape such that a curvature radius r8 of a surface thereof on the object-side and a curvature radius r9 of a surface thereof on the image plane side are both positive, so as to have a shape of a meniscus lens directing a convex surface thereof to the object side near the optical axis. Here, the shape of the fourth lens L4 is not limited to the one in Numerical Data Example 1. The fourth lenses L4 of Numerical Data Examples 2 through 5 are examples of shapes of a biconcave lens near the optical axis, and the fourth lens L4 of Numerical Data Example 7 is an example of a shape of a meniscus lens directing a concave surface thereof to the object side near the optical axis.

The fifth lens L5 is formed in an aspheric shape such that the both object-side surface and the image plane-side surface thereof have an inflection point and the object-side surface thereof is concave at the peripheral portion thereof. According to the imaging lens of Numerical Data Example 1, the fifth lens L5 is formed in a shape such that a curvature radius r10 of a surface thereof on the object-side and a curvature radius r11 of a surface thereof on the image plane side are both positive, so as to have a shape of a meniscus lens directing a convex surface thereof to the object side near the optical axis. Here, the shape of the fifth lens L5 may not be limited to the one in Numerical Data Example 1.

The sixth lens L6 is formed in an aspheric shape such that a surface thereof on the image plane side has an inflection point. According to the imaging lens of Numerical Data Example 1, the sixth lens L6 is formed in a shape such that a curvature radius r12 of a surface thereof on the object-side and a curvature radius r13 of a surface thereof on the image plane side are both positive, so as to have a shape of a meniscus lens directing a convex surface thereof to the object side near the optical axis. Here, the shape of the sixth lens L6 may not be limited to the one in Numerical Data Example 1. The sixth lens L6 of Numerical Data Example 4 is an example of a shape of a biconcave lens near the optical axis. On the other hand, the sixth lens L6 of Numerical Data Example 7 is an example of a shape of a meniscus lens directing a concave surface thereof to the object side near the optical axis.

According to the embodiment, the imaging lens satisfied the following conditional expressions (1) through (22):

$$0 < F1 \quad (1)$$

$$F2 < 0 \quad (2)$$

$$0.05 < D12/f < 0.8 \quad (3)$$

$$0.001 < D23/f < 0.3 \quad (4)$$

$$2 < D12/D23 < 30 \quad (5)$$

$$0.5 < f2/f3 < 3 \quad (6)$$

$$0.2 < f23/f < 1 \quad (7)$$

$$0.2 < f23/f < 0.8 \quad (7A)$$

$$40 < v1 < 75 \quad (8)$$

$$40 < v2 < 75 \quad (9)$$

$$40 < v3 < 75 \quad (10)$$

$$-4 < f4/f < -0.4 \quad (11)$$

$$0.15 < D45/f < 0.4 \quad (12)$$

$$0.05 < D45/L16 < 0.25 \quad (13)$$

$$1 < \Phi 5A/\Phi 4B < 2 \quad (14)$$

$$-5 < f6/f < -0.5 \quad (15)$$

$$10 < v6 < 40 \quad (16)$$

$$D56 < D12 \quad (17)$$

$$0.03 < D56/f < 0.3 \quad (18)$$

$$0.5 < T5/T6 < 3.5 \quad (19)$$

$$\Phi 1A < \Phi 6B \quad (20)$$

$$0.4 < La/H\max < 1.8 \quad (21)$$

$$f/\text{Dep} < 2.5 \quad (22)$$

In the above conditional expressions:
f: Focal length of the whole lens system
f2: Focal length of the second lens L2
f3: Focal length of the third lens L3
f4: Focal length of the fourth lens L4
f6: Focal length of the sixth lens L6
f23: Composite focal length of the second lens L2 and the third lens L3
F1: Composite focal length of the first lens L1 through the fourth lens L4
F2: Composite focal length of the fifth lens L5 and the sixth lens L6
T5: Thickness of the fifth lens L5 on an optical axis
T6: Thickness of the sixth lens L6 on an optical axis
$\Phi$1A: Effective diameter of an object-side surface of the first lens L1
$\Phi$4B: Effective diameter of an image plane-side surface of the fourth lens L4
$\Phi$5A: Effective diameter of an object-side surface of the fifth lens L5
$\Phi$6B: Effective diameter of an image plane-side surface of the sixth lens L6
D12: Distance along the optical axis X between the first lens L1 and the second lens L2
D23: Distance along the optical axis X between the second lens L2 and the third lens L3
D45: Distance along the optical axis X between the fourth lens L4 and the fifth lens L5
D56: Distance along the optical axis X between the fifth lens L5 and the sixth lens L6
L16: Distance along the optical axis X between the object-side surface of the first lens L1 and the image plane-side surface of the sixth lens L6
La: Distance on an optical axis from the object-side surface of the first lens L1 to the image plane IM (an air conversion length is employed for the filter 10)
v1: Abbe's number of the first lens L1
v2: Abbe's number of the second lens L2
v3: Abbe's number of the third lens L3
v6: Abbe's number of the sixth lens L6
Hmax: Maximum image height of the image plane IM
Dep: Diameter of entrance pupil Here, it is not necessary to satisfy all of the conditional expressions, and it is achievable to obtain an effect corresponding to the respective conditional expression when any single one of the conditional expressions is individually satisfied.

According to the embodiment, any of the lenses that lenses that compose the imaging lens is made from a plastic material. Since plastic materials are light-weighted and inexpensive, so that they have been used as lens materials for imaging lenses to be mounted in portable devices such as smartphones in these years. Typically, plastic lenses are formed by pouring molten plastic material into a mold. For this reason, fluidity of the plastic material is very important to form the material into a desired shape.

Therefore, in order to achieve both miniaturization of the imaging lens and satisfactory correction of aberrations, while securing fluidity upon molding a lens, the fourth lens L4 preferably satisfies the following conditional expression:
According to the embodiment, the imaging lens satisfied the following conditional expression:

$$1.5 < E4/T4 < 3$$

In the above conditional expression,

T4: Thickness of a fourth lens L4 on an optical axis

E4: Edge thickness of the fourth lens L4 parallel to the optical axis at the effective diameter of an object-side surface of the fourth lens L4.

According to the embodiment, lens surfaces of the respective lenses, the first lens L1 through the sixth lens L6, are formed as aspheric surfaces as necessary. An equation that express those aspheric surfaces is shown below:

$$Z = \frac{C \cdot H^2}{1 + \sqrt{1 - (1+k) \cdot C^2 \cdot H^2}} + \sum (An \cdot H^n) \quad \text{[Equation 1]}$$

In the above equation:

Z: Distance in a direction of the optical axis

H: Distance from the optical axis in a direction perpendicular to the optical axis C: Paraxial curvature (=1/r, r: paraxial curvature radius)

k: Conic constant

An: The nth aspheric coefficient

Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), n represents a refractive index at an e line, and ν represents an Abbe's number at e line, respectively. Here, aspheric surfaces are indicated with surface numbers i affixed with * (asterisk).

Numerical Data Example 1

Basic Lens Data

TABLE 1

| | | | | | | | |
|---|---|---|---|---|---|---|---|
| f = 2.78 mm  Fno = 2.3  ω = 50.0° | | | | | | | |
| | i | r | d | n | ν | [mm] | |
| L1 | 1 | ∞ | ∞ | | | | |
| | 2* | 40.000 | 0.297 | 1.5371 | 59.7 | f1 = −9.335 | |
| ST | | 4.439 | 0.413 | (=D12) | | | |
| | 3 | ∞ | 0.000 | | | | |
| L2 | 4* | 17.983 | 0.521 | 1.5371 | 59.7 | f2 = 3.368 | |
| | 5* | −1.991 | 0.076 | (=D23) | | | |
| L3 | 6* | 5.800 | 0.541 | 1.5371 | 59.7 | f3 = 2.247 | |
| | 7* | −1.474 | 0.030 | | | | |

TABLE 1-continued

| | | | | | | |
|---|---|---|---|---|---|---|
| f = 2.78 mm  Fno = 2.3  ω = 50.0° | | | | | | |
| | i | r | d | n | ν | [mm] |
| L4 | 8* | 23.274 | 0.250 | 1.6689 | 21.9 | f4 = −3.431 |
| | 9* | 2.080 | 0.692 | (=D45) | | |
| L5 | 10* | 2.092 | 0.250 | 1.5371 | 59.7 | f5 = 563.223 |
| | 11* | 2.018 | 0.237 | (=D56) | | |
| L6 | 12* | 15.030 | 0.258 | 1.6689 | 21.9 | f6 = −3.584 |
| | 13* | 2.053 | 0.160 | | | |
| | 14 | ∞ | 0.210 | 1.5187 | 64.0 | |
| | 15 | ∞ | 0.468 | | | |
| (IM) | | ∞ | | | | |

F1 = 2.412 mm
F2 = −3.768 mm
f23 = 1.451 mm
E4 = 0.565 mm
T4 = 0.250 mm
T5 = 0.250 mm
T6 = 0.258 mm
Φ1A = 2.097 mm
Φ4B = 2.558 mm
Φ5A = 2.821 mm
Φ6B = 3.764 mm
L16 = 3.680 mm
La = 4.331 mm
Hmax = 3.325 mm
Dep = 1.210 mm

TABLE 2

| Aspherical surface data | | | | | | | | |
|---|---|---|---|---|---|---|---|---|
| i | k | A4 | A6 | A8 | A10 | A12 | A14 | A16 |
| 2 | 0.000E+00 | 1.415E−01 | 1.092E−01 | 0.000E+00 | 0.000E+00 | 0.000E+00 | 0.000E+00 | 0.000E+00 |
| 4 | 0.000E+00 | 9.315E−02 | −1.915E−01 | 1.384E−01 | −5.644E−01 | 0.000E+00 | 0.000E+00 | 0.000E+00 |
| 5 | 0.000E+00 | 2.212E−02 | −5.918E−01 | 1.060E+00 | −9.266E−01 | 0.000E+00 | 0.000E+00 | 0.000E+00 |
| 6 | 0.000E+00 | −1.991E−01 | −6.045E−01 | 1.019E+00 | −3.397E−01 | 0.000E+00 | 0.000E+00 | 0.000E+00 |
| 7 | 0.000E+00 | −1.665E−01 | 2.064E−01 | −2.497E−01 | 2.528E−01 | 0.000E+00 | 0.000E+00 | 0.000E+00 |
| 8 | 0.000E+00 | 1.096E−01 | 7.046E−02 | −1.532E−01 | 4.876E−02 | 0.000E+00 | 0.000E+00 | 0.000E+00 |
| 9 | 0.000E+00 | 1.787E−01 | −1.150E−01 | −1.177E−01 | 1.698E−01 | −9.465E−02 | 2.721E−02 | −3.363E−03 |
| 10 | 0.000E+00 | −2.876E−01 | 1.713E−01 | −2.746E−01 | 3.056E−01 | −1.833E−01 | 5.877E−02 | −8.078E−03 |
| 11 | 0.000E+00 | −5.152E−02 | −1.341E−01 | 1.149E−01 | −3.289E−02 | −6.995E−03 | 5.082E−03 | −6.725E−04 |
| 12 | 0.000E+00 | 6.469E−03 | −5.598E−02 | 6.188E−02 | −2.252E−02 | −2.867E−03 | 2.899E−03 | −3.941E−04 |
| 13 | 0.000E+00 | −2.052E−01 | 7.048E−02 | −1.576E−02 | 1.153E−03 | −5.886E−04 | 2.839E−04 | −3.696E−05 |

The values of the respective conditional expressions are as follows:

$D12/f = 0.149$ $D23/f = 0.027$ $D12/D23 = 5.434$ $f2/f3 = 1.499$ $f23/f = 0.522$ $f4/f = −1.234$ $D45/f=0.249$ $D45/L16=0.188$ $\Phi 5A/\Phi 4B=1.103$ $f6/f=-1.289$ $D56/f=0.085$ $T5/T6=0.969$ $La/H\ max=1.303$ $f/Dep=2.298$ Accordingly, the imaging lens of Numerical Data Example 1 satisfies the above-described conditional expressions.

Figure 2:
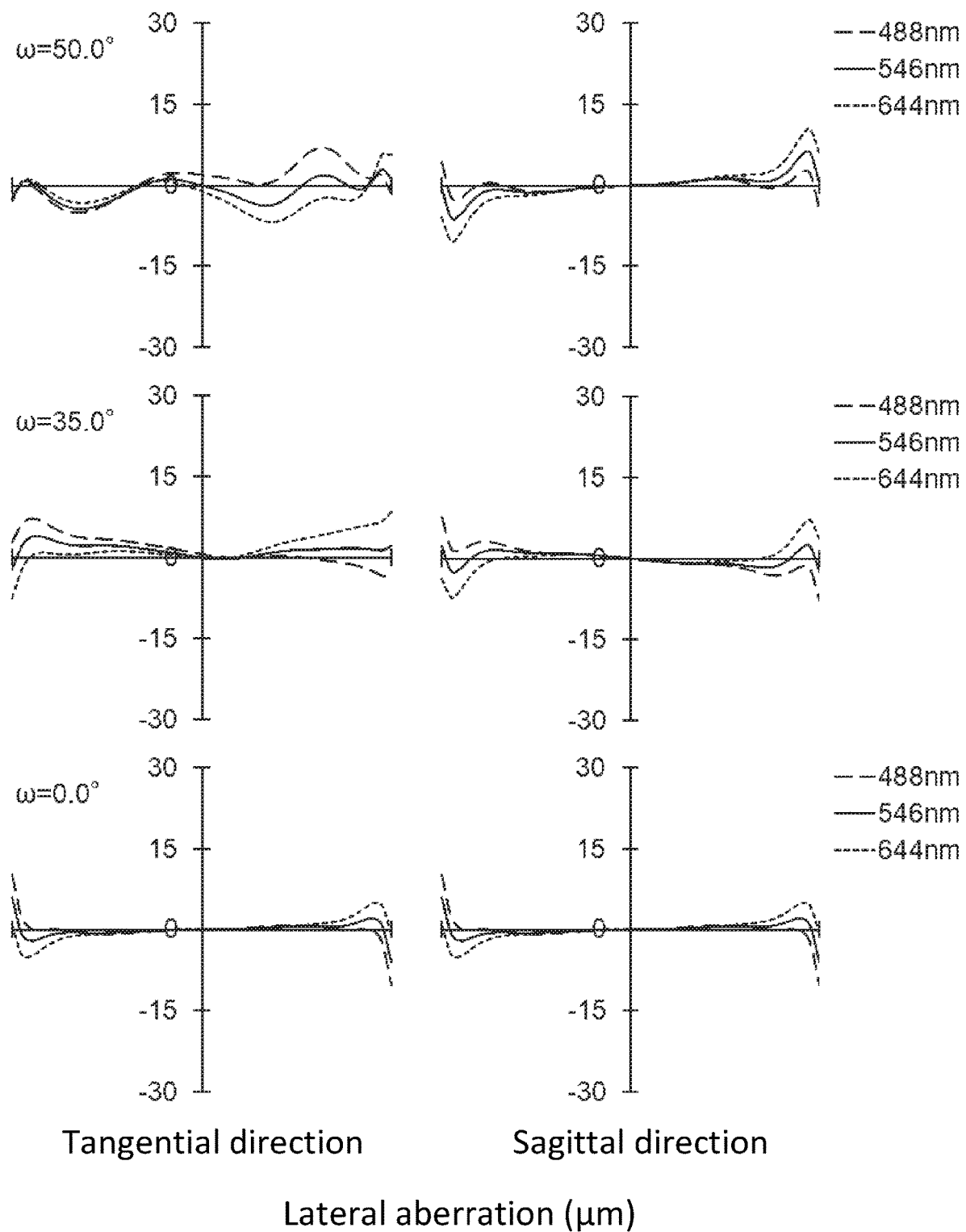
FIG. 2 is an aberration diagram showing a lateral aberration of the imaging lens of FIG. 1.
Figure 3:
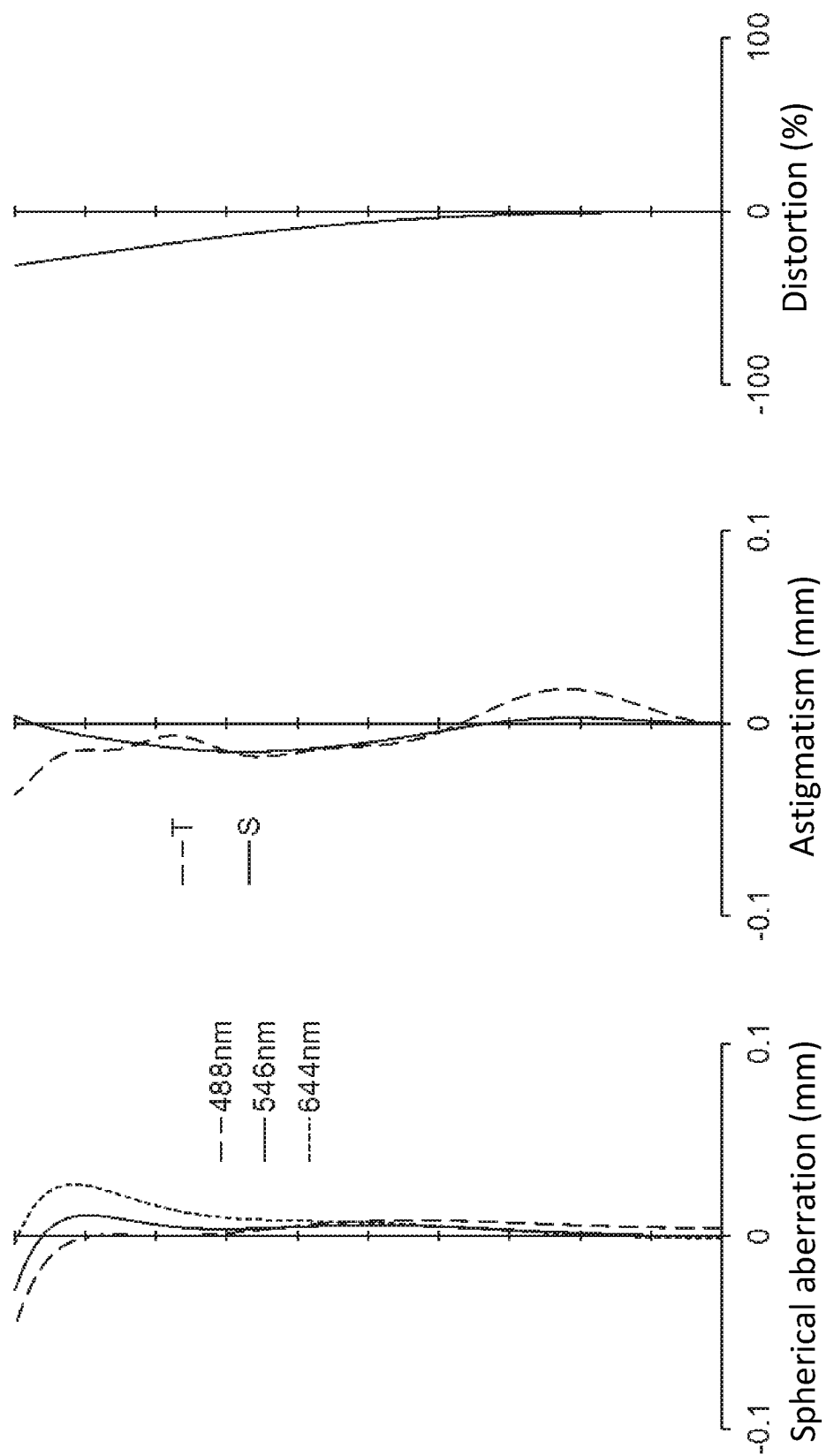
FIG. 3 is an aberration diagram showing a spherical aberration, astigmatism, and a distortion of the imaging lens of FIG. 1.
Figure 4:
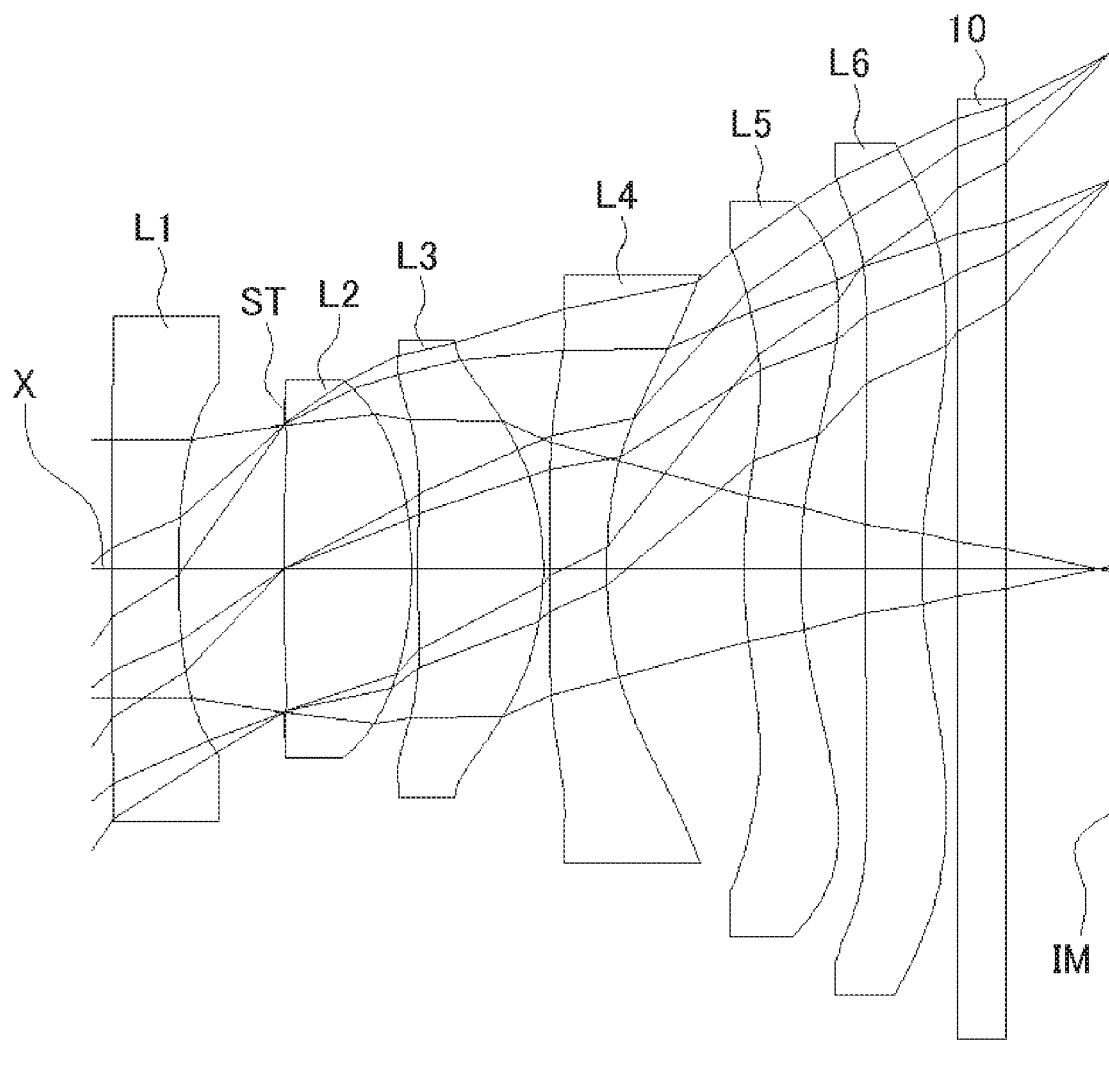
FIG. 4 is a sectional view showing a schematic configuration of an imaging lens in Numerical Data Example 2 of the present invention.

FIG. 2 shows a lateral aberration that corresponds to a half angle of view ω, which is divided into a tangential direction and a sagittal direction (The same is true for FIGS. 5, 8, 11, 14, 17, and 20). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, 18, and 21). As shown in FIGS. 2 and 3, according to the imaging lens of Numerical Data Example 1, the aberrations are satisfactorily corrected.

Numerical Data Example 2

Basic Lens Data

TABLE 3

| | | | f = 2.66 mm Fno = 2.2 ω = 55.0° | | | |
|---|---|---|---|---|---|---|
| | i | r | d | n | ν | [mm] |
| L1 | 1 | ∞ | ∞ | | | |
| | 2* | 65.000 | 0.295 | 1.5371 | 59.7 | f1 = −7.963 |
| ST | 3 | 4.007 | 0.462 | (=D12) | | |
| L2 | 4* | ∞ | 0.000 | | | |
| | 5* | 10.906 | 0.564 | 1.5371 | 59.7 | f2 = 2.993 |
| | | −1.851 | 0.027 | (=D23) | | |
| L3 | 6* | 6.504 | 0.554 | 1.5371 | 59.7 | f3 = 2.205 |
| | 7* | −1.405 | 0.029 | | | |

TABLE 3-continued

| | | | f = 2.66 mm Fno = 2.2 ω = 55.0° | | | |
|---|---|---|---|---|---|---|
| | i | r | d | n | ν | [mm] |
| L4 | 8* | −16.734 | 0.250 | 1.6689 | 21.9 | f4 = −3.234 |
| | 9* | 2.500 | 0.604 | (=D45) | | |
| L5 | 10* | 2.163 | 0.250 | 1.5371 | 59.7 | f5 = 127.633 |
| | 11* | 2.143 | 0.282 | (=D56) | | |
| L6 | 12* | 19.465 | 0.250 | 1.6689 | 21.9 | f6 = −3.462 |
| | 13* | 2.059 | 0.160 | | | |
| | 14 | ∞ | 0.210 | 1.5187 | 64.0 | |
| | 15 | ∞ | 0.467 | | | |
| (IM) | | ∞ | | | | |

F1 = 2.305 mm
F2 = −3.726 mm
f23 = 1.371 mm
E4 = 0.600 mm
T4 = 0.250 mm
T5 = 0.250 mm
T6 = 0.250 mm
Φ1A = 2.230 mm
Φ4B = 2.597 mm
Φ5A = 2.843 mm
Φ6B = 3.762 mm
L16 = 3.568 mm
La = 4.333 mm
Hmax = 3.816 mm
Dep = 1.193 mm

TABLE 4

| | | | | Aspherical surface data | | | | |
|---|---|---|---|---|---|---|---|---|
| i | k | A4 | A6 | A8 | A10 | A12 | A14 | A16 |
| 2 | 0.000E+00 | 1.272E−01 | 1.085E−01 | 0.000E+00 | 0.000E+00 | 0.000E+00 | 0.000E+00 | 0.000E+00 |
| 4 | 0.000E+00 | 5.752E−02 | −2.163E−01 | 1.711E−01 | −7.241E−01 | 0.000E+00 | 0.000E+00 | 0.000E+00 |
| 5 | 0.000E+00 | −5.608E−02 | −5.231E−01 | 1.099E+00 | −9.814E−01 | 0.000E+00 | 0.000E+00 | 0.000E+00 |
| 6 | 0.000E+00 | −2.803E−01 | −5.734E−01 | 1.114E+00 | −4.050E−01 | 0.000E+00 | 0.000E+00 | 0.000E+00 |
| 7 | 0.000E+00 | −1.824E−01 | 2.425E−01 | −2.830E−01 | 2.515E−01 | 0.000E+00 | 0.000E+00 | 0.000E+00 |
| 8 | 0.000E+00 | 1.537E−01 | 3.826E−02 | −1.570E−01 | 5.545E−01 | 0.000E+00 | 0.000E+00 | 0.000E+00 |
| 9 | 0.000E+00 | 2.463E−01 | −1.849E−01 | −7.733E−02 | 1.600E−01 | −9.253E−02 | 2.587E−02 | −3.029E−03 |
| 10 | 0.000E+00 | −2.396E−01 | 1.424E−01 | −2.598E−01 | 3.013E−01 | −1.833E−01 | 5.917E−02 | −8.148E−03 |
| 11 | 0.000E+00 | −1.710E−02 | −1.611E−01 | 1.230E−01 | −3.237E−02 | −7.528E−03 | 5.101E−03 | −6.493E−04 |
| 12 | 0.000E+00 | −2.771E−03 | −5.158E−02 | 6.045E−02 | −2.197E−02 | −2.753E−03 | 2.858E−03 | −3.947E−04 |
| 13 | 0.000E+00 | −2.035E−01 | 6.654E−02 | −1.453E−02 | 1.114E−03 | −5.971E−04 | 2.974E−04 | −3.965E−05 |

The values of the respective conditional expressions are as follows:

$D12/f=0.174$ $D23/f=0.010$ $D12/D23=17.1$ $f2/f3=1.357$ $f23/f=0.515$ $f4/f=-1.216$ $D45/f=0.227$ $D45/L16=0.169$ $\Phi 5A/\Phi 4B=1.095$ $f6/f=-1.302$ $D56/f=0.106$ $T5/16=1.000$ $La/H\ max=1.135$ $f/Dep=2.230$ Accordingly, the imaging lens of Numerical Data Example 2 satisfies the above-described conditional expressions.

Figure 5:
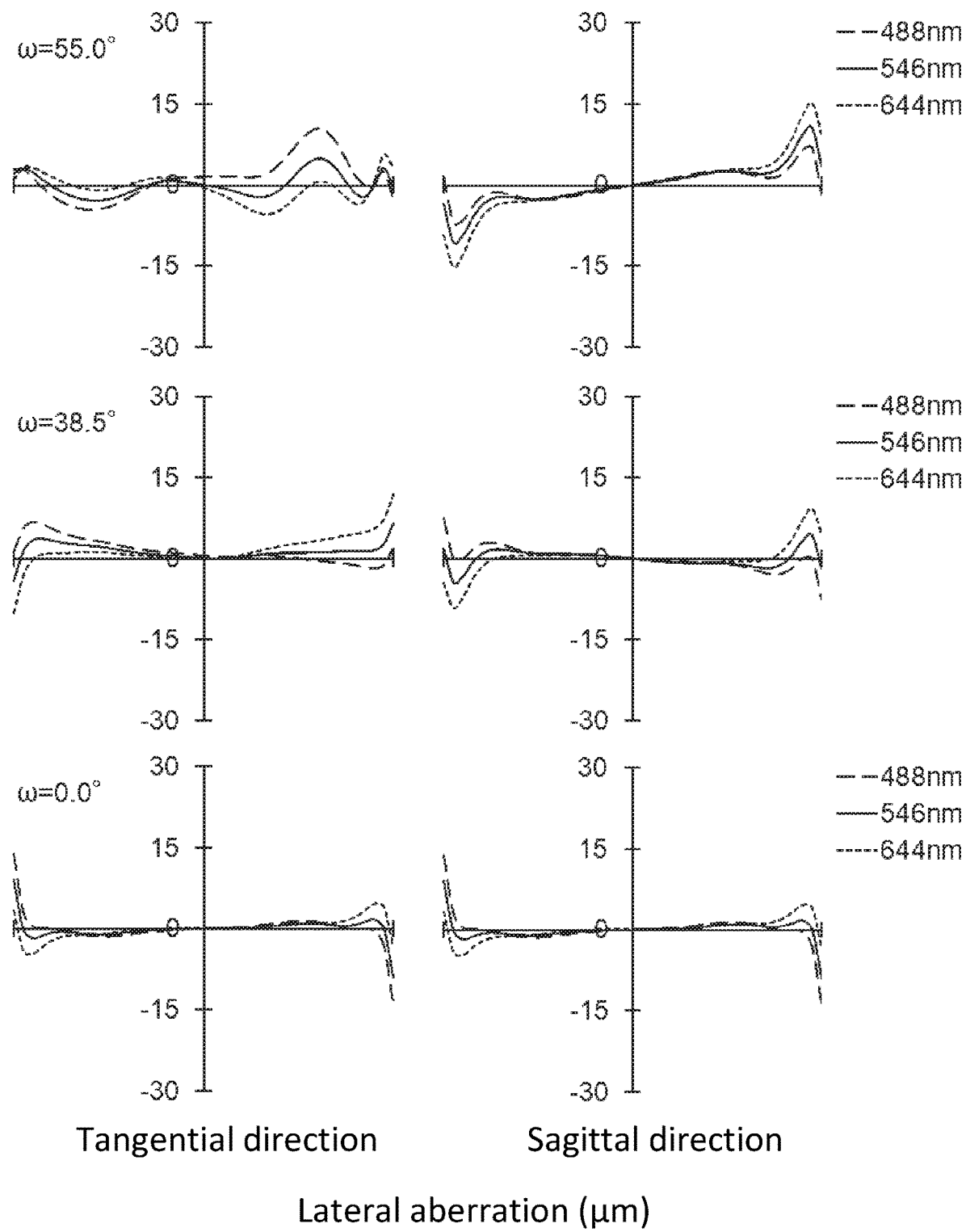
FIG. 5 is an aberration diagram showing a lateral aberration of the imaging lens of FIG. 4.
Figure 6:
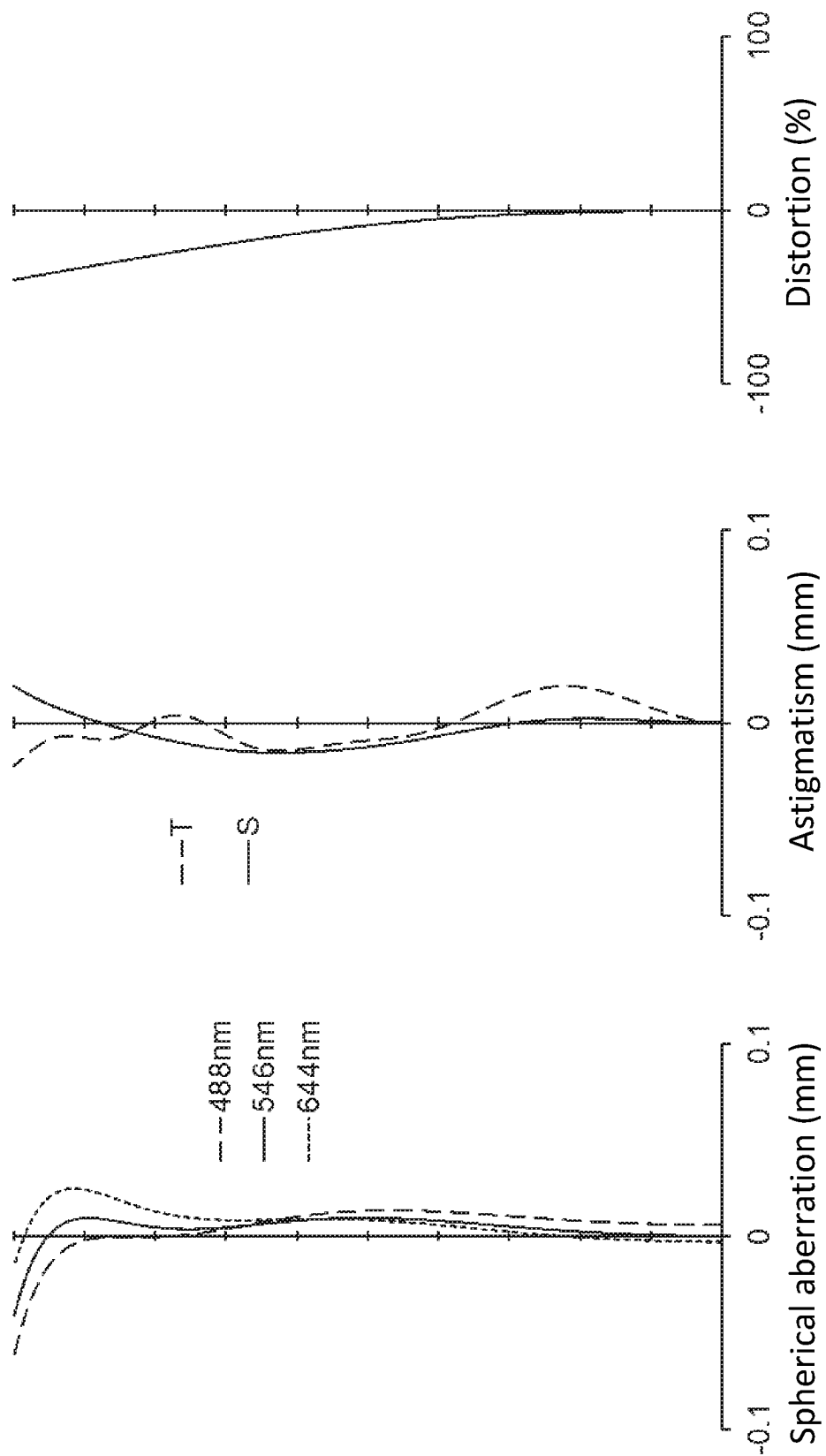
FIG. 6 is an aberration diagram showing a spherical aberration, astigmatism, and a distortion of the imaging lens of FIG. 4.
Figure 7:
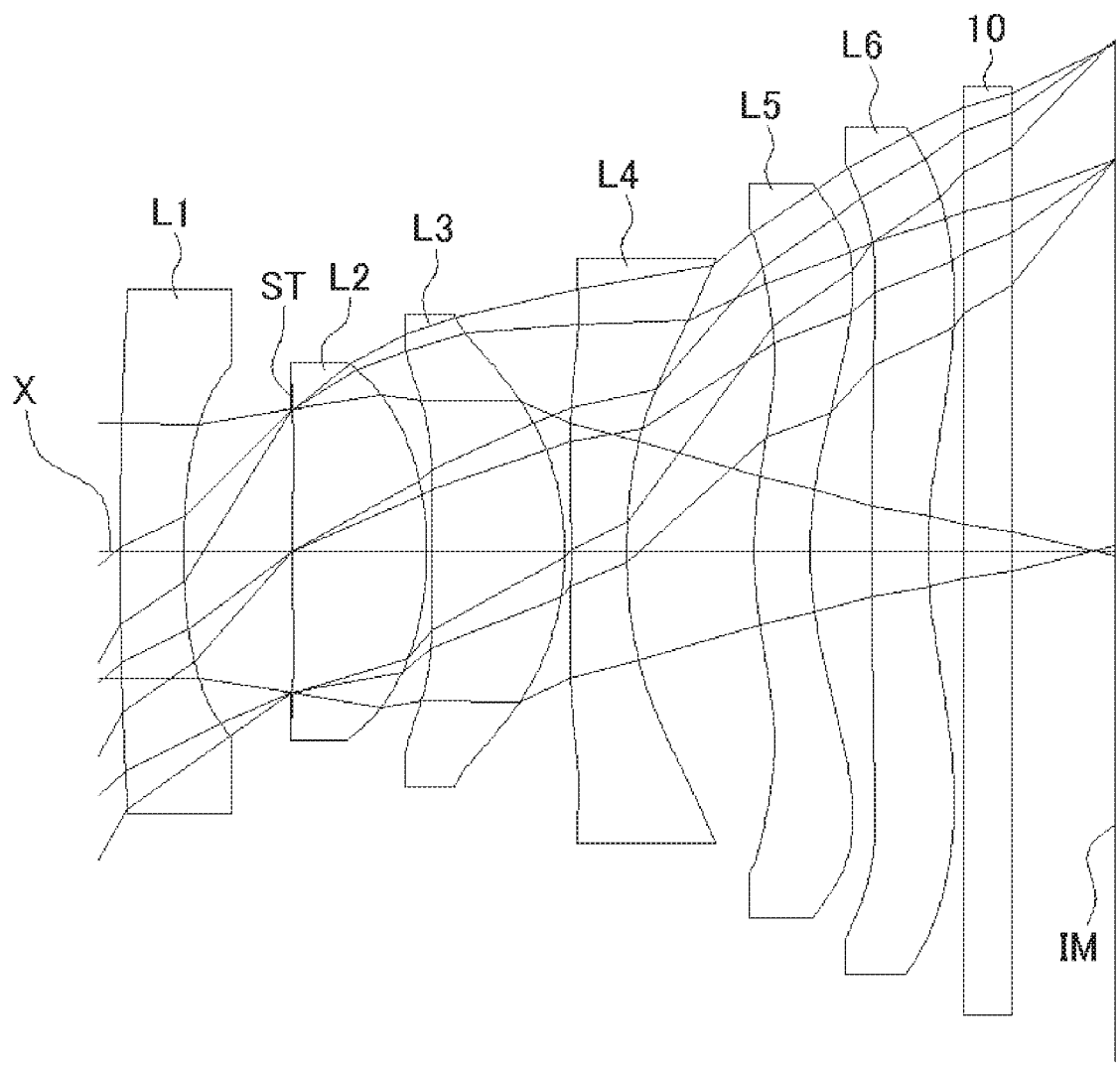
FIG. 7 is a sectional view showing a schematic configuration of an imaging lens in Numerical Data Example 3 of the present invention.

FIG. 5 shows a lateral aberration that corresponds to a half angle of view ω, and FIG. 6 shows a spherical aberration (mm), astigmatism (mm), and a distortion (%), respectively. As shown in FIGS. 5 and 6, according to the imaging lens of Numerical Data Example 2, the aberrations are satisfactorily corrected.

Numerical Data Example 3

Basic Lens Data

TABLE 5

| | | f = 2.53 mm Fno = 2.1 ω = 60.0° | | | | |
|---|---|---|---|---|---|---|
| | i | r | d | n | ν | [mm] |
| | | ∞ | ∞ | | | |
| L1 | 1 | 20.000 | 0.282 | 1.5371 | 59.7 | f1 = −6.709 |
| | 2* | 3.038 | 0.483 | (=D12) | | |
| ST | 3 | ∞ | 0.000 | | | |
| L2 | 4* | 11.779 | 0.598 | 1.5371 | 59.7 | f2 = 2.536 |
| | 5* | −1.513 | 0.023 | (=D23) | | |
| L3 | 6* | 19.043 | 0.589 | 1.5371 | 59.7 | f3 = 2.390 |
| | 7* | −1.361 | 0.029 | | | |
| L4 | 8* | −12.105 | 0.249 | 1.6689 | 21.9 | f4 = −3.358 |
| | 9* | 2.781 | 0.564 | (=D45) | | |
| L5 | 10* | 1.798 | 0.250 | 1.5371 | 59.7 | f5 = 41.223 |
| | 11* | 1.862 | 0.274 | (=D56) | | |
| L6 | 12* | 33.410 | 0.249 | 1.6689 | 21.9 | f6 = −3.260 |
| | 13* | 2.041 | 0.160 | | | |
| | 14 | ∞ | 0.210 | 1.5187 | 64.0 | |
| | 15 | ∞ | 0.458 | | | |
| (IM) | | ∞ | | | | |

F1 = 2.226 mm
F2 = −3.783 mm
f23 = 1.348 mm
E4 = 0.614 mm
T4 = 0.249 mm
T5 = 0.250 mm
T6 = 0.249 mm
Φ1A = 2.335 mm
Φ4B = 2.602 mm
Φ5A = 2.875 mm
Φ6B = 3.767 mm
L16 = 3.589 mm
La = 4.345 mm
Hmax = 4.399 mm
Dep = 1.181 mm The values of the respective conditional expressions are as follows:

$D12/f=0.191$ $D23/f=0.009$ $D12/D23=21.0$ $f2/f3=1.061$ $f23/f=0.533$ $f4/f=-1.327$ $D45/f=0.223$ $D45/L16=0.157$ $\Phi 5A/\Phi 4B=1.105$ $f6/f=-1.289$ $D56/f=0.108$ $T5/T6=1.004$ $La/H\max=0.988$ $f/\mathrm{Dep}=2.142$ Accordingly, the imaging lens of Numerical Data Example 3 satisfies the above-described conditional expressions.

Figure 8:
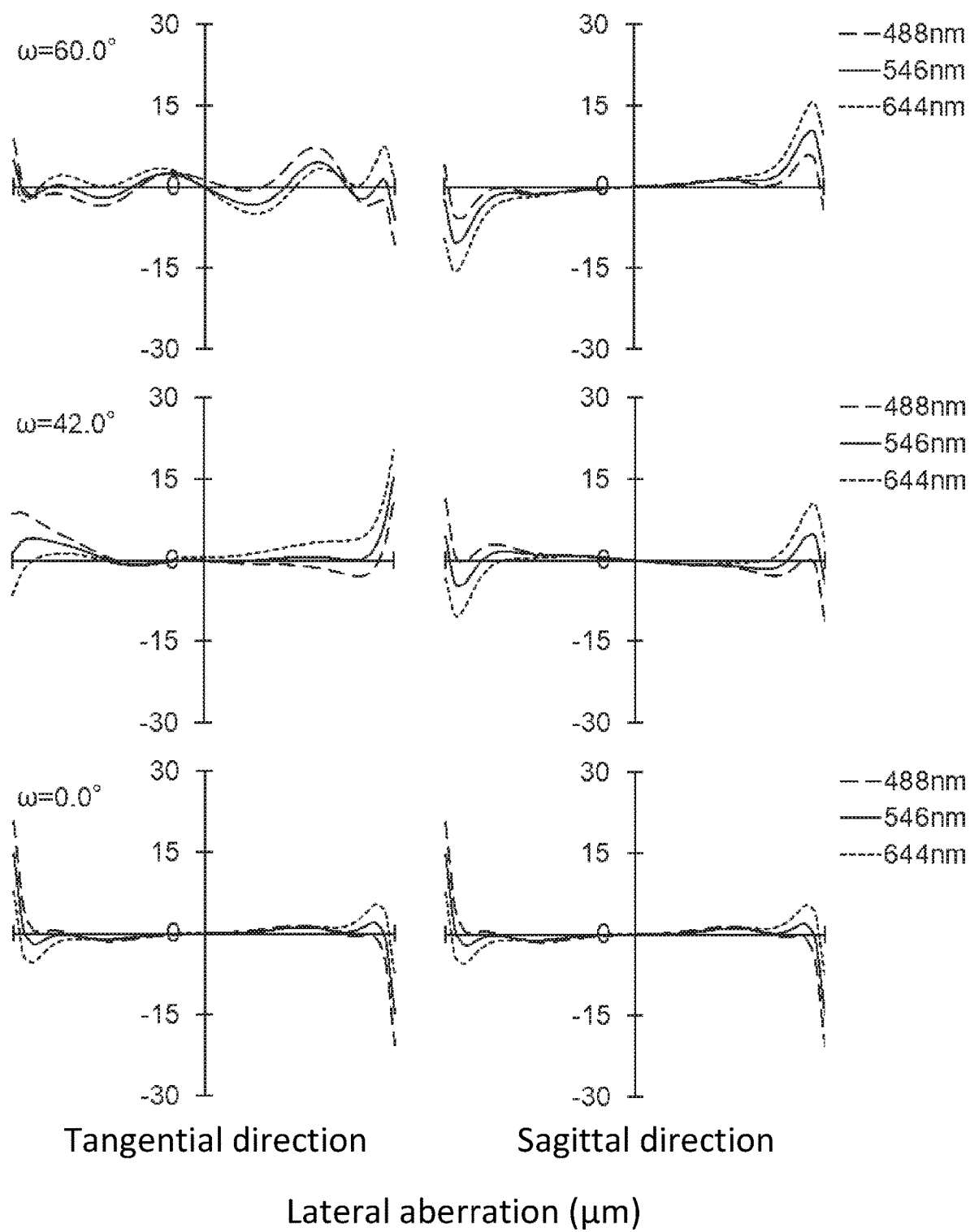
FIG. 8 is an aberration diagram showing a lateral aberration of the imaging lens of FIG. 7.
Figure 9:
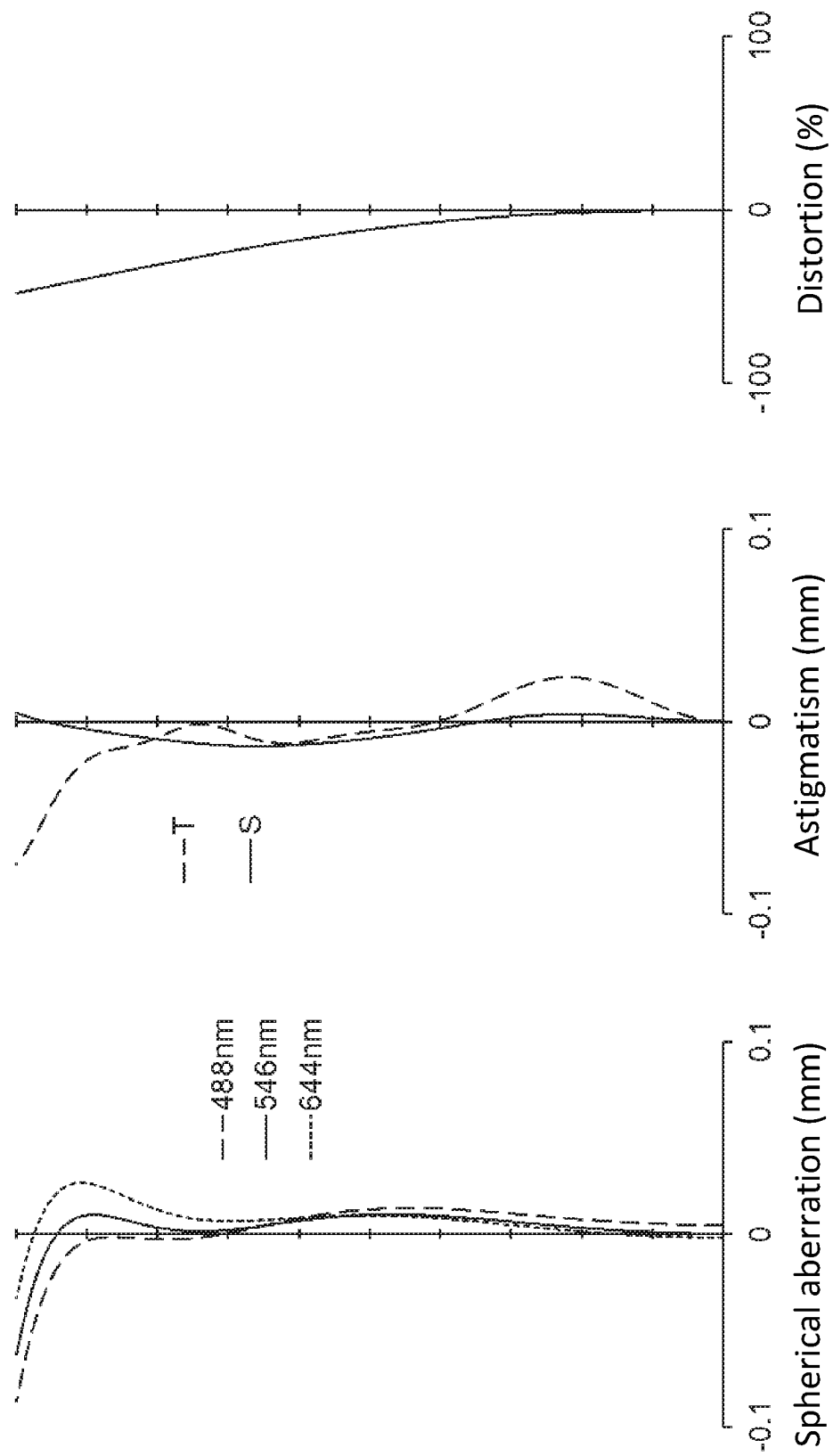
FIG. 9 is an aberration diagram showing a spherical aberration, astigmatism, and a distortion of the imaging lens of FIG. 7.
Figure 10:
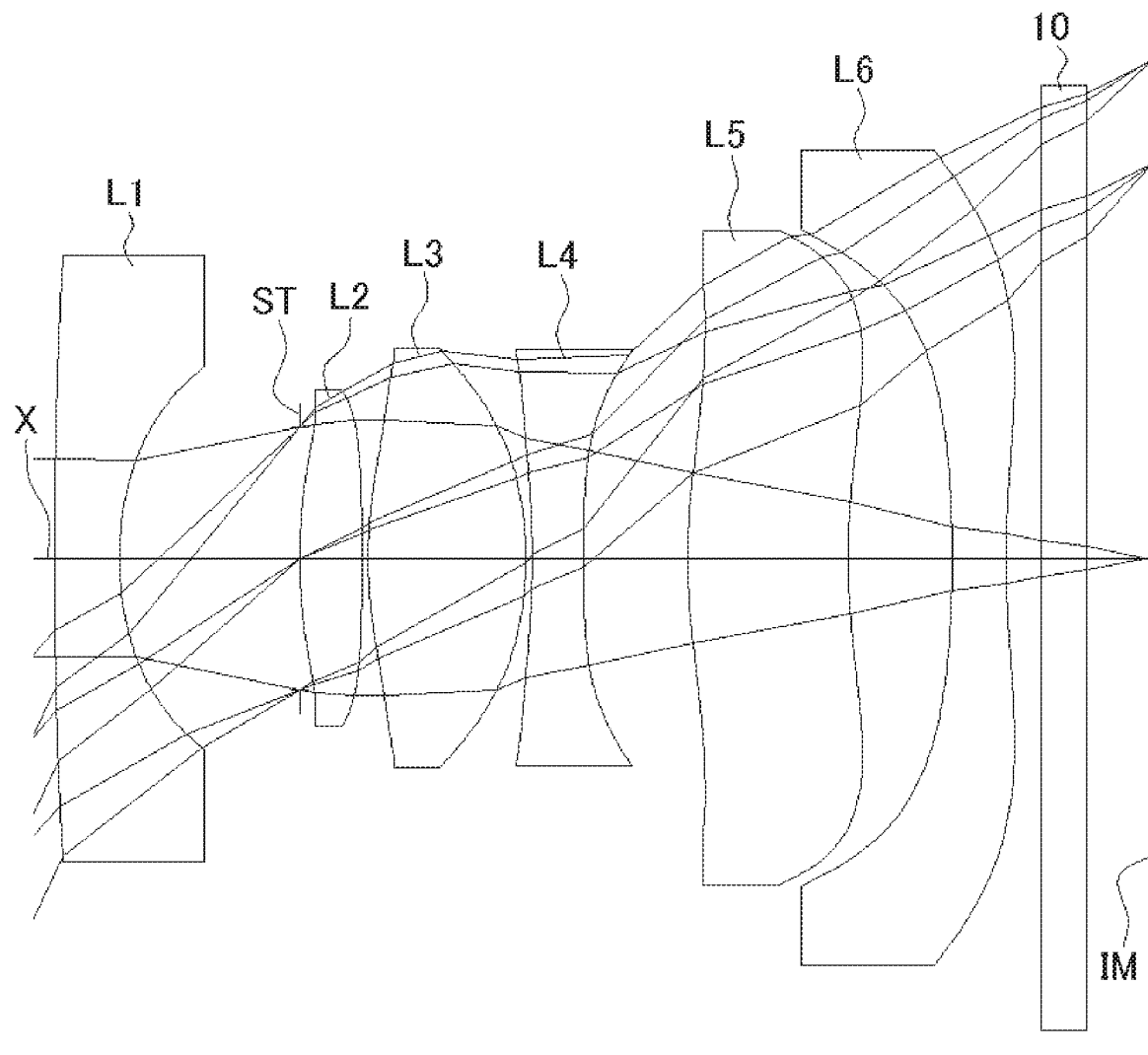
FIG. 10 is a sectional view showing a schematic configuration of an imaging lens in Numerical Data Example 4 of the present invention.

FIG. 8 shows a lateral aberration that corresponds to a half angle of view ω, and FIG. 9 shows a spherical aberration (mm), astigmatism (mm), and a distortion (%), respectively. As shown in FIGS. 8 and 9, according to the imaging lens of Numerical Data Example 3, the aberrations are satisfactorily corrected.

TABLE 6

| Aspherical surface data | | | | | | | |
|---|---|---|---|---|---|---|---|
| i | k | A4 | A6 | A8 | A10 | A12 | A14 | A16 |
| 2 | 0.000E+00 | 1.083E−01 | 1.363E−01 | 0.000E+00 | 0.000E+00 | 0.000E+00 | 0.000E+00 | 0.000E+00 |
| 4 | 0.000E+00 | −1.696E−02 | −2.046E−01 | 1.107E−01 | −8.524E−01 | 0.000E+00 | 0.000E+00 | 0.000E+00 |
| 5 | 0.000E+00 | −1.491E−02 | −6.050E−01 | 1.153E+00 | −9.687E−01 | 0.000E+00 | 0.000E+00 | 0.000E+00 |
| 6 | 0.000E+00 | −1.976E−01 | −6.009E−01 | 1.007E+00 | −3.531E−01 | 0.000E+00 | 0.000E+00 | 0.000E+00 |
| 7 | 0.000E+00 | −1.825E−01 | 2.348E−01 | −2.527E−01 | 1.751E−01 | 0.000E+00 | 0.000E+00 | 0.000E+00 |
| 8 | 0.000E+00 | 9.946E−02 | 6.890E−02 | −1.368E−01 | 4.217E−02 | 0.000E+00 | 0.000E+00 | 0.000E+00 |
| 9 | 0.000E+00 | 1.967E−01 | −1.028E−01 | −1.190E−01 | 1.691E−01 | −9.477E−02 | 2.709E−02 | −3.243E−03 |
| 10 | 0.000E+00 | −2.968E−01 | 1.787E−01 | −2.732E−01 | 3.046E−01 | −1.844E−01 | 5.846E−02 | −7.777E−03 |
| 11 | 0.000E+00 | −6.406E−02 | −1.332E−01 | 1.154E−01 | −3.298E−02 | −7.078E−03 | 5.075E−03 | −6.568E−04 |
| 12 | 0.000E+00 | 1.336E−01 | −5.541E−02 | 6.187E−02 | −2.251E−02 | −2.856E−03 | 2.901E−03 | −3.949E−04 |
| 13 | 0.000E+00 | −2.049E−01 | 7.063E−02 | −1.563E−02 | 1.195E−03 | −5.811E−04 | 2.831E−04 | −3.848E−05 |

Numerical Data Example 4

Basic Lens Data

TABLE 7

| | | | f = 2.29 mm Fno = 2.5 ω = 65.0° | | | |
|---|---|---|---|---|---|---|
| | i | r | d | n | ν | [mm] |
| | | ∞ | ∞ | | | |
| L1 | 1 | 25.000 | 0.297 | 1.5371 | 59.7 | f1 = −2.829 |
| | 2* | 1.427 | 0.823 | (=D12) | | |
| ST | 3 | ∞ | 0.000 | | | |
| L2 | 4* | 2.525 | 0.284 | 1.5371 | 59.7 | f2 = 4.036 |
| | 5* | −14.727 | 0.028 | (=D23) | | |
| L3 | 6* | 1.989 | 0.719 | 1.5371 | 59.7 | f3 = 1.866 |
| | 7* | −1.765 | 0.030 | | | |
| L4 | 8* | −4.416 | 0.234 | 1.6689 | 21.9 | f4 = −4.559 |
| | 9* | 10.068 | 0.475 | (=D45) | | |
| L5 | 10* | 2.576 | 0.733 | 1.5371 | 59.7 | f5 = 16.345 |
| | 11* | 3.283 | 0.473 | (=D56) | | |
| L6 | 12* | −6.086 | 0.246 | 1.6689 | 21.9 | f6 = −3.649 |
| | 13* | 4.142 | 0.160 | | | |
| | 14 | ∞ | 0.210 | 1.5187 | 64.0 | |
| | 15 | ∞ | 0.295 | | | |
| (IM) | | ∞ | | | | |

F1 = 2.337 mm
F2 = −5.675 mm
f23 = 1.382 mm
E4 = 0.531 mm
T4 = 0.234 mm
T5 = 0.733 mm
T6 = 0.246 mm
Φ1A = 2.771 mm
Φ4B = 1.901 mm
Φ5A = 2.546 mm
Φ6B = 3.723 mm
L16 = 4.342 mm
La = 4.936 mm
Hmax = 4.928 mm
Dep = 0.933 mm

TABLE 8

| | | | | Aspherical surface data | | | |
|---|---|---|---|---|---|---|---|
| i | k | A4 | A6 | A8 | A10 | A12 | A14 | A16 |
| 2 | 0.000E+00 | 8.079E−02 | 8.943E−02 | 0.000E+00 | 0.000E+00 | 0.000E+00 | 0.000E+00 | 0.000E+00 |
| 4 | 0.000E+00 | 5.733E−02 | −3.539E−01 | 5.452E−01 | −1.102E+00 | 0.000E+00 | 0.000E+00 | 0.000E+00 |
| 5 | 0.000E+00 | −2.481E−03 | −6.686E−01 | 1.394E+00 | −1.425E+00 | 0.000E+00 | 0.000E+00 | 0.000E+00 |
| 6 | 0.000E+00 | −9.953E−02 | −3.865E−01 | 5.781E−01 | −2.218E−01 | 0.000E+00 | 0.000E+00 | 0.000E+00 |
| 7 | 0.000E+00 | −2.564E−01 | 1.857E−01 | −5.165E−02 | −1.136E−03 | 0.000E+00 | 0.000E+00 | 0.000E+00 |
| 8 | 0.000E+00 | 1.748E−02 | 1.250E−01 | −9.787E−02 | −3.044E−02 | 0.000E+00 | 0.000E+00 | 0.000E+00 |
| 9 | 0.000E+00 | 2.157E−01 | 1.537E−01 | −1.432E−01 | −7.412E−02 | −1.109E−01 | 3.267E−01 | −4.616E−01 |
| 10 | 0 000E+00 | −2 133E−01 | 2.118E−01 | −2 878E−01 | 3.013E−01 | −1.850E−01 | 5.764E−02 | −6.998E−03 |
| 11 | 0.000E+00 | −8.199E−02 | −1.587E−02 | 1.172E−02 | −9.381E−03 | 1.016E−03 | 7.069E−04 | −2.936E−04 |
| 12 | 0.000E+00 | −4.251E−02 | −1.777E−02 | 8.796E−04 | 6.072E−03 | −6.467E−03 | 1.065E−04 | 5.410E−04 |
| 13 | 0.000E+00 | −1.106E−01 | 2.847E−02 | −9.564E−03 | 3.138E−03 | −8.436E−04 | 1.353E−04 | −8.052E−06 |

The values of the respective conditional expressions are as follows:

$D12/f$=0.359

$D23/f$=0.012

$D12/D23$=29.4

$f2/f3$=2.163

$f23/f$=0.603

$f4/f$=−1.991

$D45/f$=0.207

$D45/L16$=0.109

$Φ5A/Φ4B$=1.339

$f6/f$=−1.593

$D56/f$=0.207

$T5/16$=2.980

$La/H$ max=1.002

$f$/Dep=2.454

Accordingly, the imaging lens of Numerical Data Example 4 satisfies the above-described conditional expressions.

Figure 11:
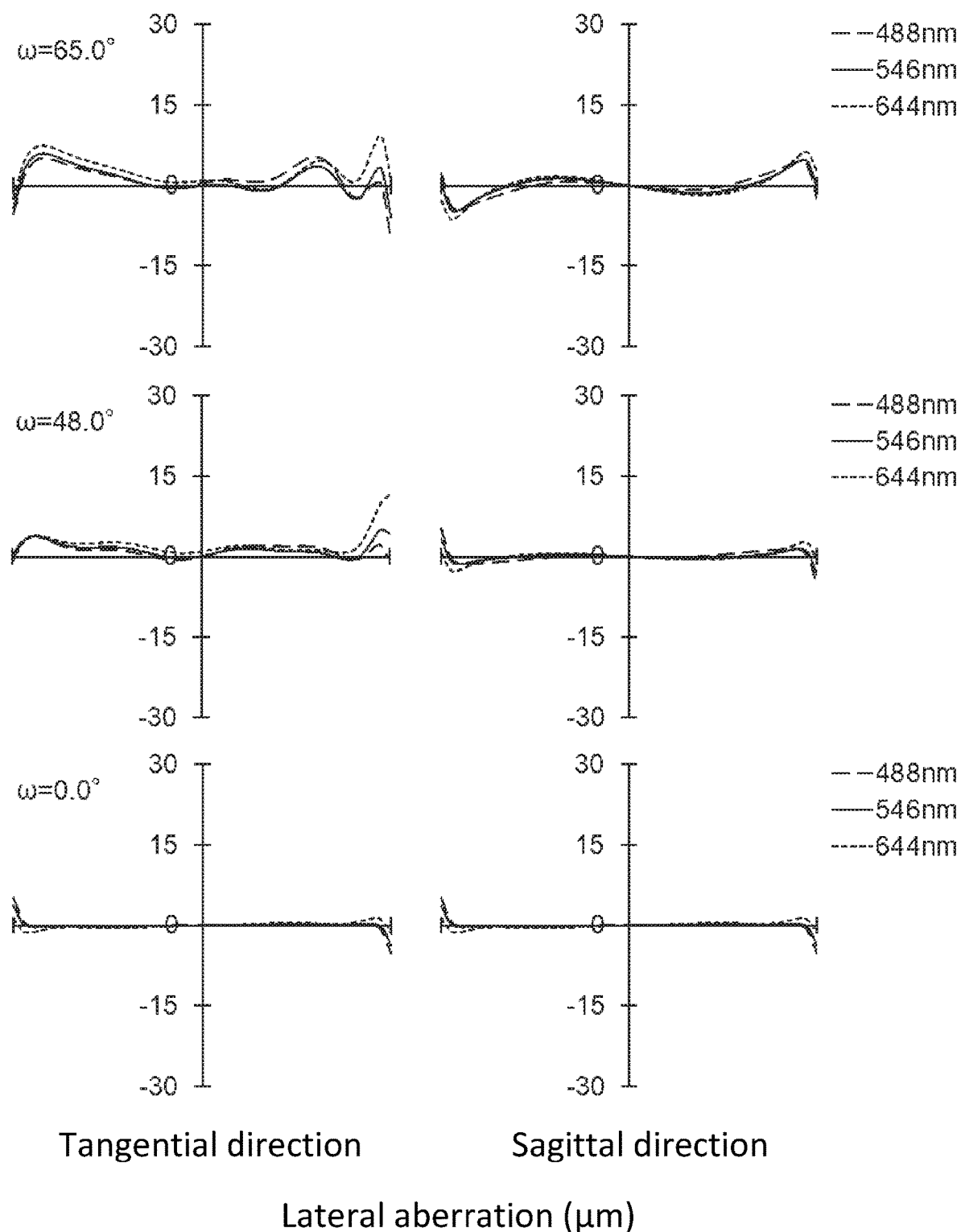
FIG. 11 is an aberration diagram showing a lateral aberration of the imaging lens of FIG. 10.
Figure 12:
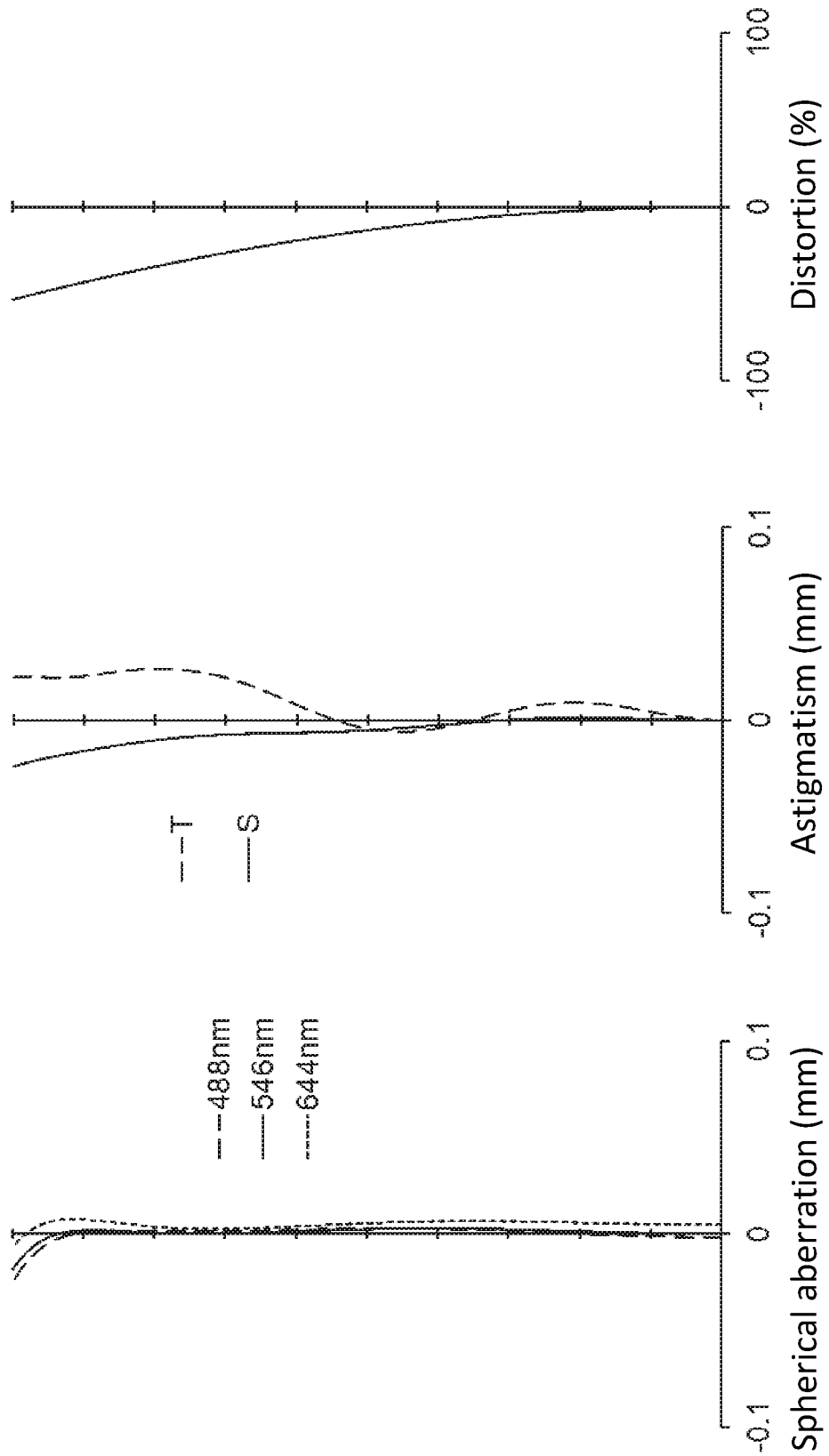
FIG. 12 is an aberration diagram showing a spherical aberration, astigmatism, and a distortion of the imaging lens of FIG. 10.
Figure 13:
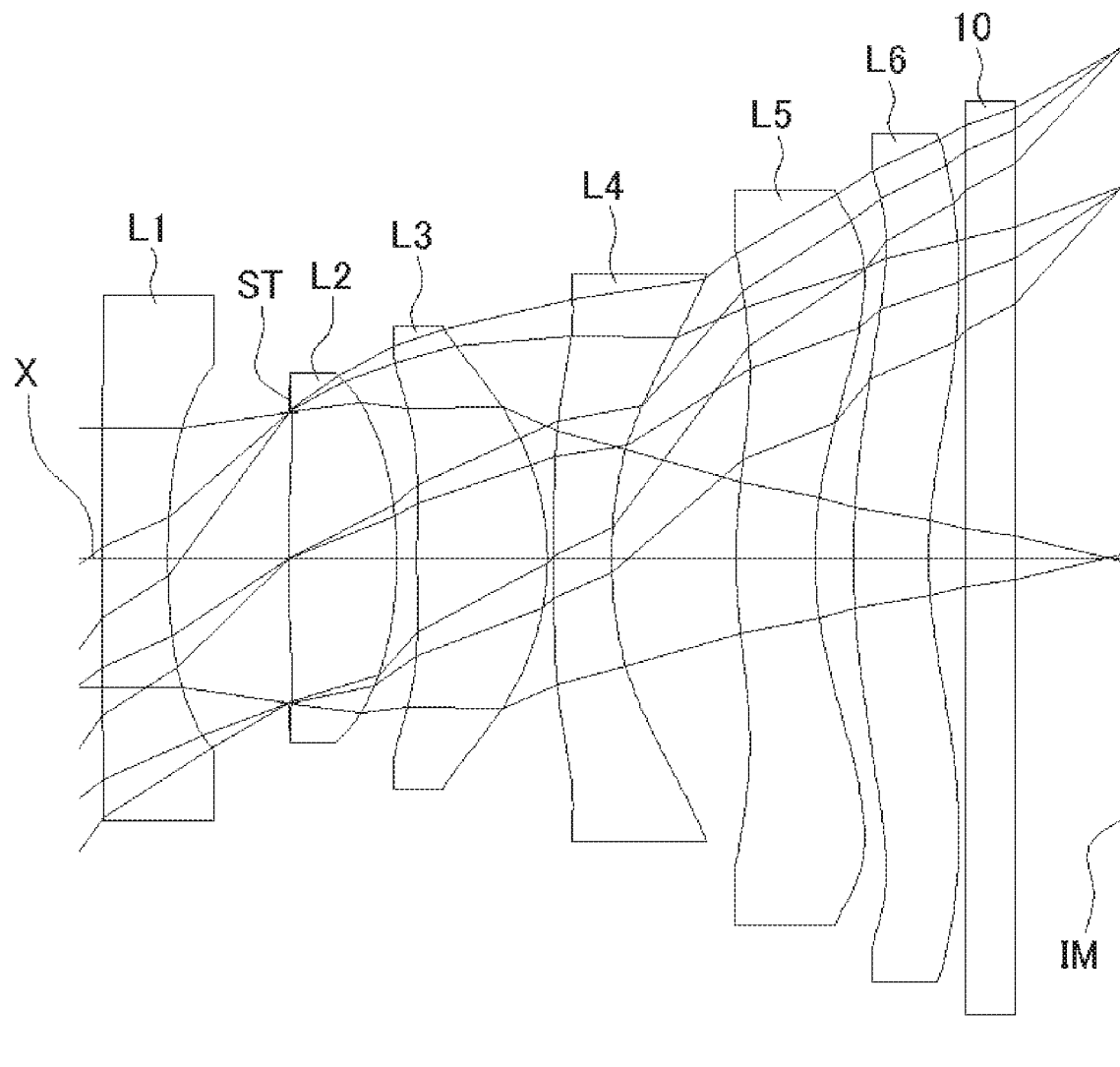
FIG. 13 is a sectional view showing a schematic configuration of an imaging lens in Numerical Data Example 5 of the present invention.

FIG. 11 shows a lateral aberration that corresponds to a half angle of view ω, and FIG. 12 shows a spherical aberration (mm), astigmatism (mm), and a distortion (%), respectively. As shown in FIGS. 11 and 12, according to the imaging lens of Numerical Data Example 4, the aberrations are satisfactorily corrected.

Numerical Data Example 5

Basic Lens Data

TABLE 9

| | | f = 2.49 mm Fno = 2.1 ω = 55.0° | | | | |
|---|---|---|---|---|---|---|
| | i | r | d | n | ν | [mm] |
| | | ∞ | ∞ | | | |
| L1 | 1 | 65.000 | 0.285 | 1.5371 | 59.7 | f1 = −6. 561 |
| | 2* | 3.338 | 0.522 | (=D12) | | |

TABLE 9-continued

| | | f = 2.49 mm Fno = 2.1 ω = 55.0° | | | | |
|---|---|---|---|---|---|---|
| | i | r | d | n | ν | [mm] |
| ST | 3 | ∞ | 0.000 | | | |
| L2 | 4* | 7.314 | 0.468 | 1.5371 | 59.7 | f2 = 2.791 |
| | 5* | −1.843 | 0.087 | (=D23) | | |
| L3 | 6* | 11.443 | 0.564 | 1.5371 | 59.7 | f3 = 2.115 |
| | 7* | −1.239 | 0.029 | | | |
| L4 | 8* | −248.289 | 0.249 | 1.6689 | 21.9 | f4 = −3.078 |
| | 9* | 2.077 | 0.538 | (=D45) | | |
| L5 | 10* | 2.482 | 0.341 | 1.5371 | 59.7 | f5 = −12.963 |
| | 11* | 1.742 | 0.166 | (=D56) | | |

TABLE 9-continued

| | | f = 2.49 mm Fno = 2.1 ω = 55.0° | | | | |
|---|---|---|---|---|---|---|
| | i | r | d | n | ν | [mm] |
| L6 | 12* | 3.579 | 0.325 | 1.6689 | 21.9 | f6 = −7.503 |
| | 13* | 2.013 | 0.160 | | | |
| | 14 | ∞ | 0.210 | 1.5187 | 64.0 | |
| | 15 | ∞ | 0.469 | | | |
| (IM) | | ∞ | | | | |

F1 = 2.250 mm
F2 = −4.745 mm
f23 = 1.336 mm
E4 = 0.582 mm
T4 = 0.249 mm
T5 = 0.341 mm
T6 = 0.325 mm
Φ1A = 2.276 mm
Φ4B = 2.460 mm
Φ5A = 2.668 mm
Φ6B = 3.669 mm
L16 = 3.575 mm
La = 4.343 mm
Hmax = 3.564 mm
Dep = 1.169 mm

TABLE 10

| Aspherical surface data | | | | | | | | |
|---|---|---|---|---|---|---|---|---|
| i | k | A4 | A6 | A8 | A10 | A12 | A14 | A16 |
| 2 | 0.000E+00 | 1.136E−01 | 1.077E−01 | 0.000E+00 | 0.000E+00 | 0.000E+00 | 0.000E+00 | 0.000E+00 |
| 4 | 0.000E+00 | 2.267E−02 | −1.885E−01 | −1.118E−02 | −5.695E−01 | 0.000E+00 | 0.000E+00 | 0.000E+00 |
| 5 | 0.000E+00 | −3.544E−03 | −6.393E−01 | 1 250E+00 | −1.171E+00 | 0.000E+00 | 0.000E+00 | 0.000E+00 |
| 6 | 0.000E+00 | −2.786E−01 | −5.026E−01 | 1.052E+00 | −4.037E−01 | 0.000E+00 | 0.000E+00 | 0.000E+00 |
| 7 | 0.000E+00 | −1.208E−01 | 2.236E−01 | −2.748E−01 | 2.297E−01 | 0.000E+00 | 0.000E+00 | 0.000E+00 |
| 8 | 0.000E+00 | 1.646E−01 | 1.476E−02 | −1.637E−01 | 6.415E−02 | 0.000E+00 | 0.000E+00 | 0.000E+00 |
| 9 | 0.000E+00 | 2.133E−01 | −1.791E−01 | −7.378E−02 | 1.547E−01 | −9.141E−02 | 2.731E−02 | −3.602E−03 |
| 10 | 0.000E+00 | −2.197E−01 | 1.323E−01 | −2.406E−01 | 3.001E−01 | −1.862E−01 | 5.886E−02 | −7.962E−03 |
| 11 | 0.000E+00 | −7.109E−02 | −1.297E−01 | 1.145E−01 | −3.423E−02 | −7.412E−03 | 5.250E−03 | −6.378E−04 |
| 12 | 0.000E+00 | −2.340E−02 | −5.176E−02 | 6.059E−02 | −2.193E−02 | −2.752E−03 | 2.855E−03 | −3.937E−04 |
| 13 | 0.000E+00 | −1.954E−01 | 6.462E−02 | −1.396E−02 | 1.250E−03 | −5.840E−04 | 2.932E−04 | −4.443E−05 |

The values of the respective conditional expressions are as follows:

$D12/f = 0.210$ $D23/f = 0.035$ $D12/D23 = 6.0$ $f2/f3 = 1.320$ $f23/f = 0.537$ $f4/f = −1.236$ $D45/f = 0.216$ $D45/L16 = 0.150$ $Φ5A/Φ4B = 1.085$ $f6/f = −3.013$ $D56/f = 0.067$ $T5/T6 = 1.049$ $La/H\,max = 1.219$ $f/Dep = 2.130$ Accordingly, the imaging lens of Numerical Data Example 5 satisfies the above-described conditional expressions.

Figure 14:
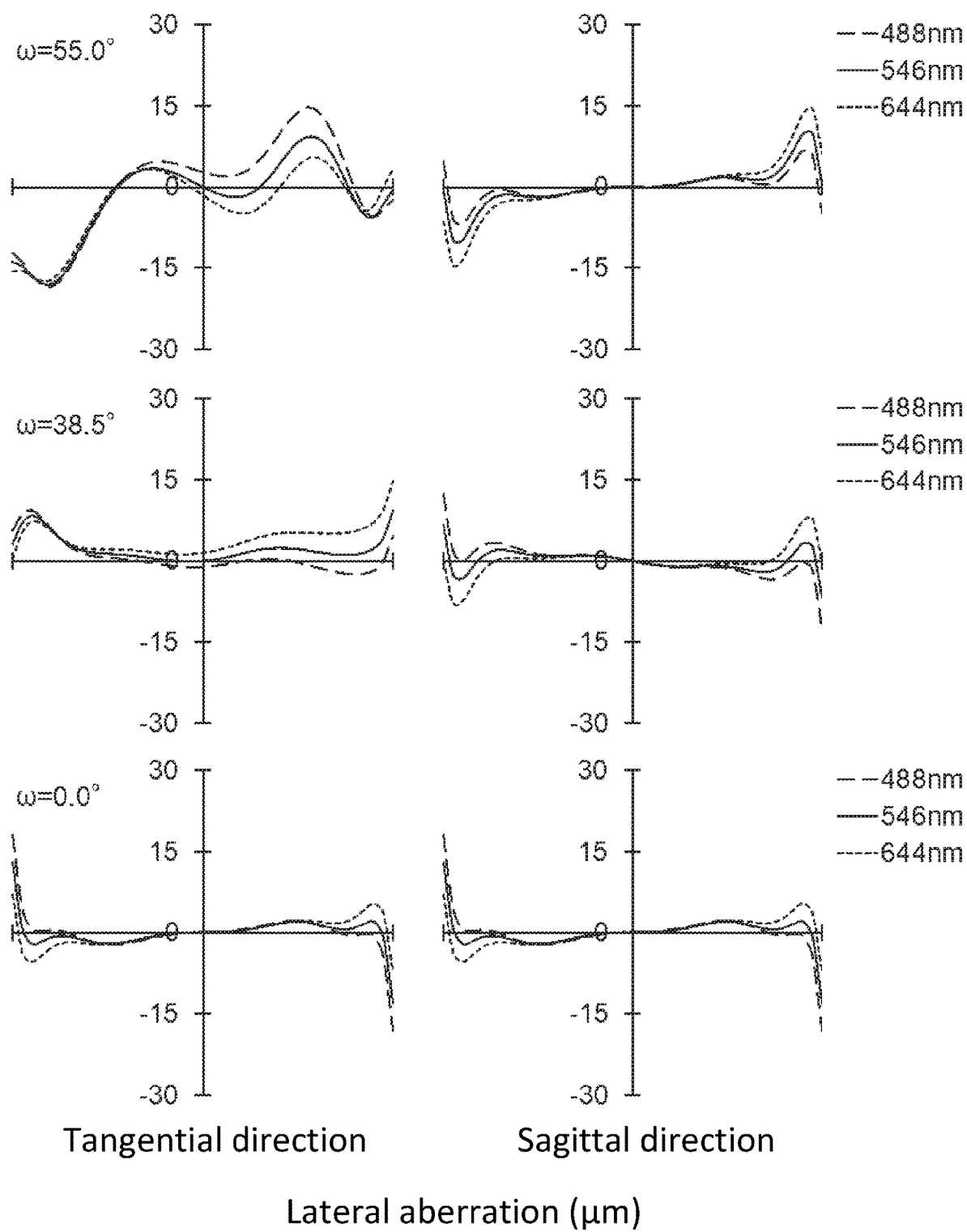
FIG. 14 is an aberration diagram showing a lateral aberration of the imaging lens of FIG. 13.
Figure 15:
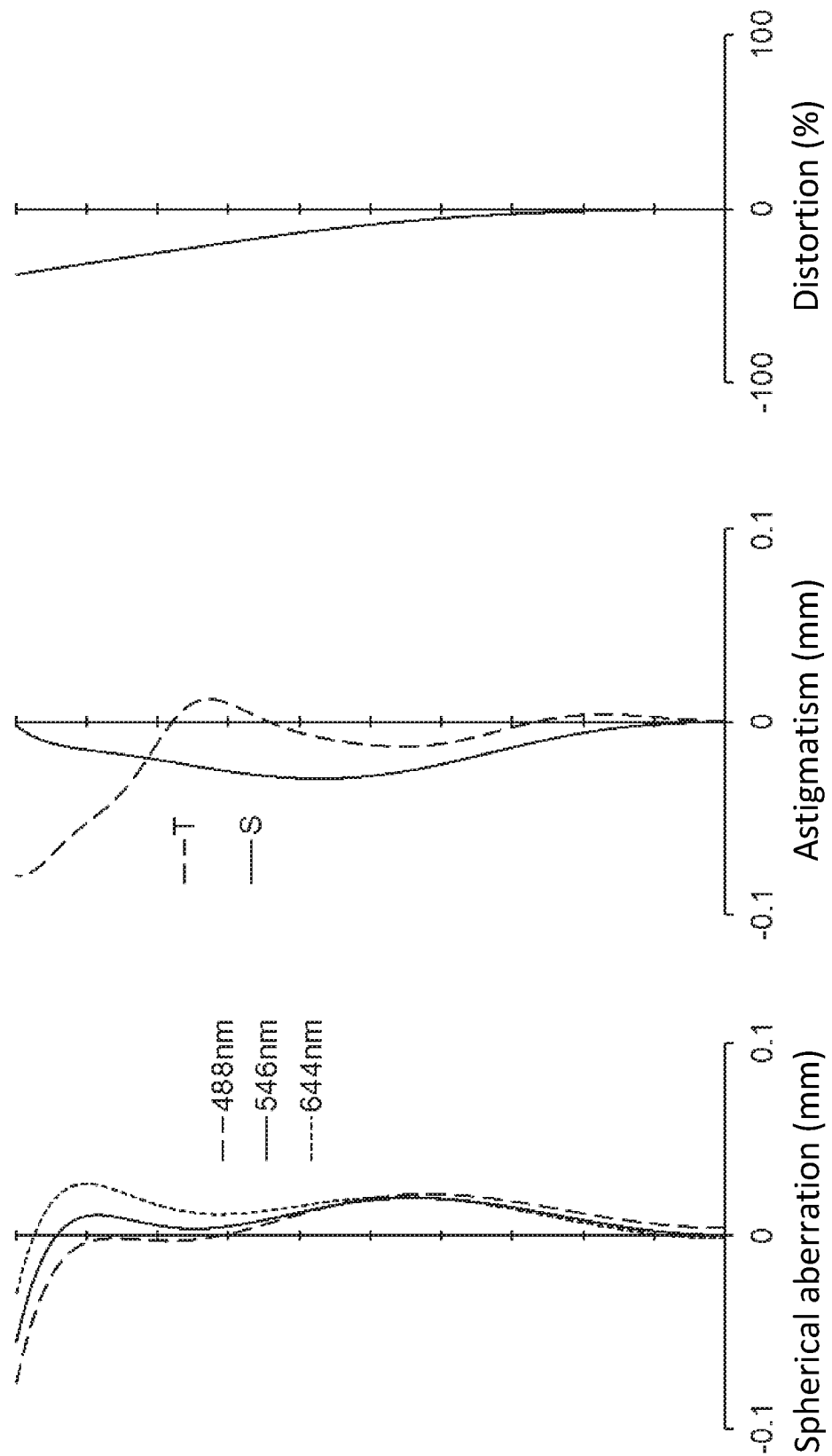
FIG. 15 is an aberration diagram showing a spherical aberration, astigmatism, and a distortion of the imaging lens of FIG. 13.
Figure 16:
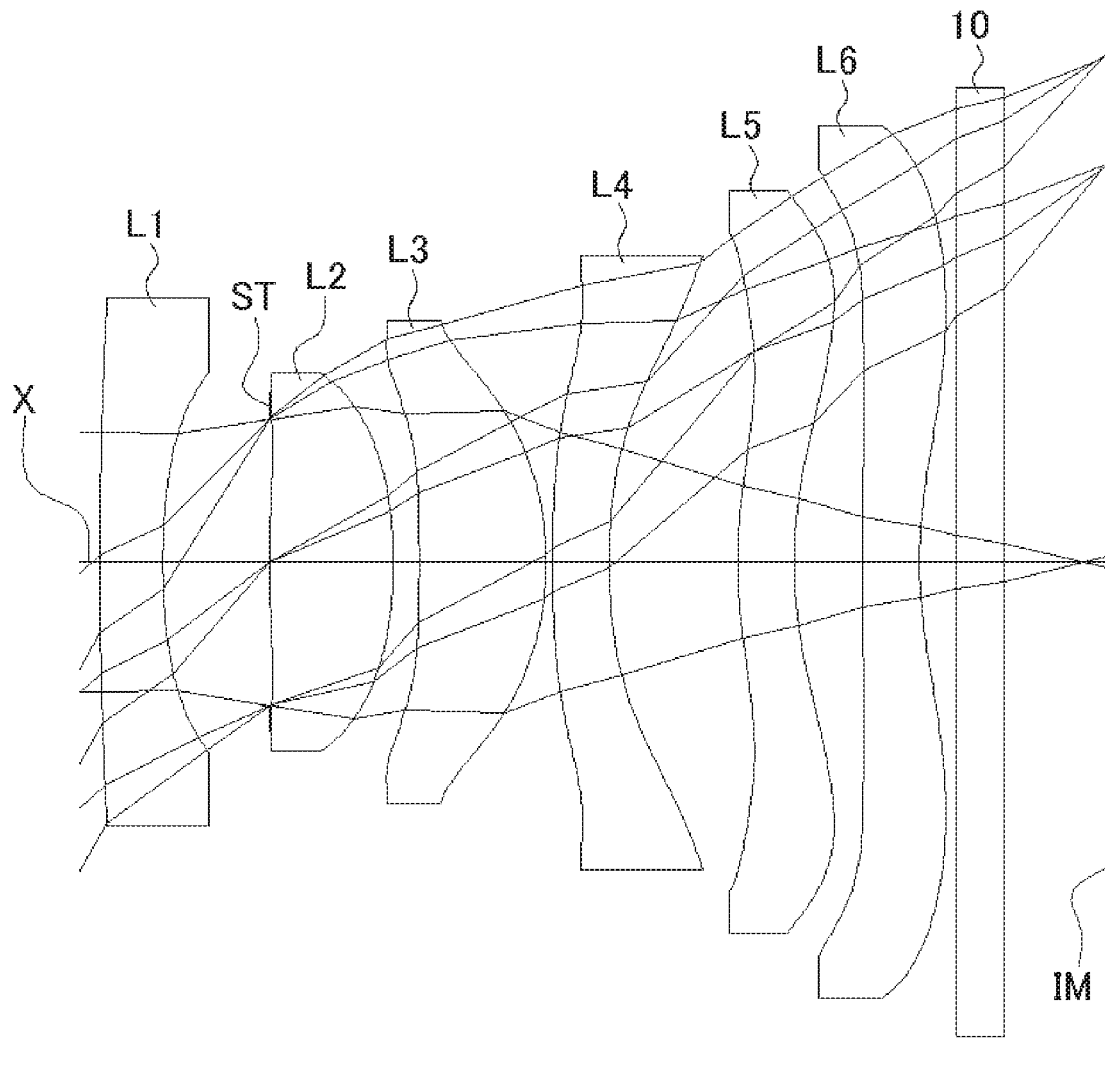
FIG. 16 is a sectional view showing a schematic configuration of an imaging lens in Numerical Data Example 6 of the present invention.

FIG. 14 shows a lateral aberration that corresponds to a half angle of view ω, and FIG. 15 shows a spherical aberration (mm), astigmatism (mm), and a distortion (%), respectively. As shown in FIGS. 14 and 15, according to the imaging lens of Numerical Data Example 5, the aberrations are satisfactorily corrected.

Numerical Data Example 6

Basic Lens Data

TABLE 11

| | | f = 2.55 mm Fno = 2.2 ω = 60.0° | | | | |
|---|---|---|---|---|---|---|
| | i | r | d | n | ν | [mm] |
| | | ∞ | ∞ | | | |
| L1 | 1 | 20.000 | 0.277 | 1.5371 | 59.7 | f1 = −6.734 |
| | 2* | 3.048 | 0.470 | (=D12) | | |
| ST | 3 | ∞ | 0.000 | | | |

TABLE 11-continued

| | | f = 2.55 mm Fno = 2.2 ω = 60.0° | | | | |
|---|---|---|---|---|---|---|
| | i | r | d | n | ν | [mm] |
| L2 | 4* | 7.066 | 0.542 | 1.5371 | 59.7 | f2 = 2.860 |
| | 5* | −1.910 | 0.113 | (=D23) | | |
| L3 | 6* | −21.273 | 0.557 | 1.5371 | 59.7 | f3 = 3.005 |
| | 7* | −1.514 | 0.028 | | | |
| L4 | 8* | 5.988 | 0.249 | 1.6689 | 21.9 | f4 = −8.141 |
| | 9* | 2.805 | 0.563 | (=D45) | | |
| L5 | 10* | 2.062 | 0.249 | 1.5371 | 59.7 | f5 = −348.606 |
| | 11* | 1.953 | 0.302 | (=D56) | | |
| L6 | 12* | 36.355 | 0.249 | 1.6689 | 21.9 | f6 = −3.243 |
| | 13* | 2.041 | 0.160 | | | |
| | 14 | ∞ | 0.210 | 1.5187 | 64.0 | |
| | 15 | ∞ | 0.452 | | | |
| (IM) | | ∞ | | | | |

F1 = 2.163 mm
F2 = −3.348 mm
f23 = 1.625 mm
E4 = 0.533 mm
T4 = 0.249 mm
T5 = 0.249 mm
T6 = 0.249 mm
Φ1A = 2.326 mm
Φ4B = 2.702 mm

TABLE 11-continued f = 2.55 mm Fno = 2.2 ω = 60.0°

| i | r | d | n | ν | [mm] |
|---|---|---|---|---|---|

Φ5A = 2.903 mm
Φ6B = 3.839 mm
L16 = 3.599 mm
La = 4.349 mm
Hmax = 4.433 mm
Dep = 1.183 mm

TABLE 12

Aspherical surface data

| i | k | A4 | A6 | A8 | A10 | A12 | A14 | A16 |
|---|---|---|---|---|---|---|---|---|
| 2 | 0.000E+00 | 1.060E-01 | 1.034E-01 | 0.000E+00 | 0.000E+00 | 0 000E+00 | 0 000E+00 | 0.000E+00 |
| 4 | 0.000E+00 | -2.672E-02 | -2.048E-01 | 6.523E-02 | -6.922E-01 | 0.000E+00 | 0.000E+00 | 0.000E+00 |
| 5 | 0.000E+00 | -4.406E-02 | -6.568E-01 | 1.188E+00 | -1.012E+00 | 0.000E+00 | 0.000E+00 | 0.000E+00 |
| 6 | 0.000E+00 | -1.898E-01 | -5.761E-01 | 1.017E+00 | -3.654E-01 | 0 000E+00 | 0 000E+00 | 0.000E+00 |
| 7 | 0.000E+00 | -2.372E-01 | 2.461E-01 | -2.351E-01 | 1.655E-01 | 0.000E+00 | 0.000E+00 | 0.000E+00 |
| 8 | 0.000E+00 | 6.785E-02 | 5.892E-02 | -1.329E-01 | 4.258E-02 | 0.000E+00 | 0.000E+00 | 0.000E+00 |
| 9 | 0.000E+00 | 2.130E-01 | -1.065E-01 | -1.240E-01 | 1.684E-01 | -9.393E-02 | 2.759E-02 | -3.419E-03 |
| 10 | 0.000E+00 | -2.697E-01 | 1.788E-01 | -2.730E-01 | 3.048E-01 | -1.842E-01 | 5.848E-02 | -7.848E-03 |
| 11 | 0.000E+00 | -5.522E-02 | -1.344E-01 | 1.143E-01 | -3.301E-02 | -6.984E-03 | 5.112E-03 | -6.594E-04 |
| 12 | 0.000E+00 | 3.781E-03 | -5.498E-02 | 6.225E-02 | -2.251E-02 | -2.898E-03 | 2.889E-03 | -3.905E-04 |
| 13 | 0.000E+00 | -2.044E-01 | 6.994E-02 | -1.564E-02 | 1.283E-03 | -5.497E-04 | 2.844E-04 | -4.317E-05 |

The values of the respective conditional expressions are as follows:

$D12/f = 0.184$ $D23/f = 0.044$ $D12/D23 = 4.159$ $f2/f3 = 0.952$ $f23/f = 0.637$ $f4/f = -3.193$ $D45/f = 0.221$ $D45/L16 = 0.156$ $\Phi 5A/\Phi 4B = 1.074$ $f6/f = -1.272$ $D56/f = 0.118$ $T5/f6 = 1.000$ $La/H\max = 0.981$ $f/\text{Dep} = 2.156$ Accordingly, the imaging lens of Numerical Data Example 6 satisfies the above-described conditional expressions.

Figure 17:
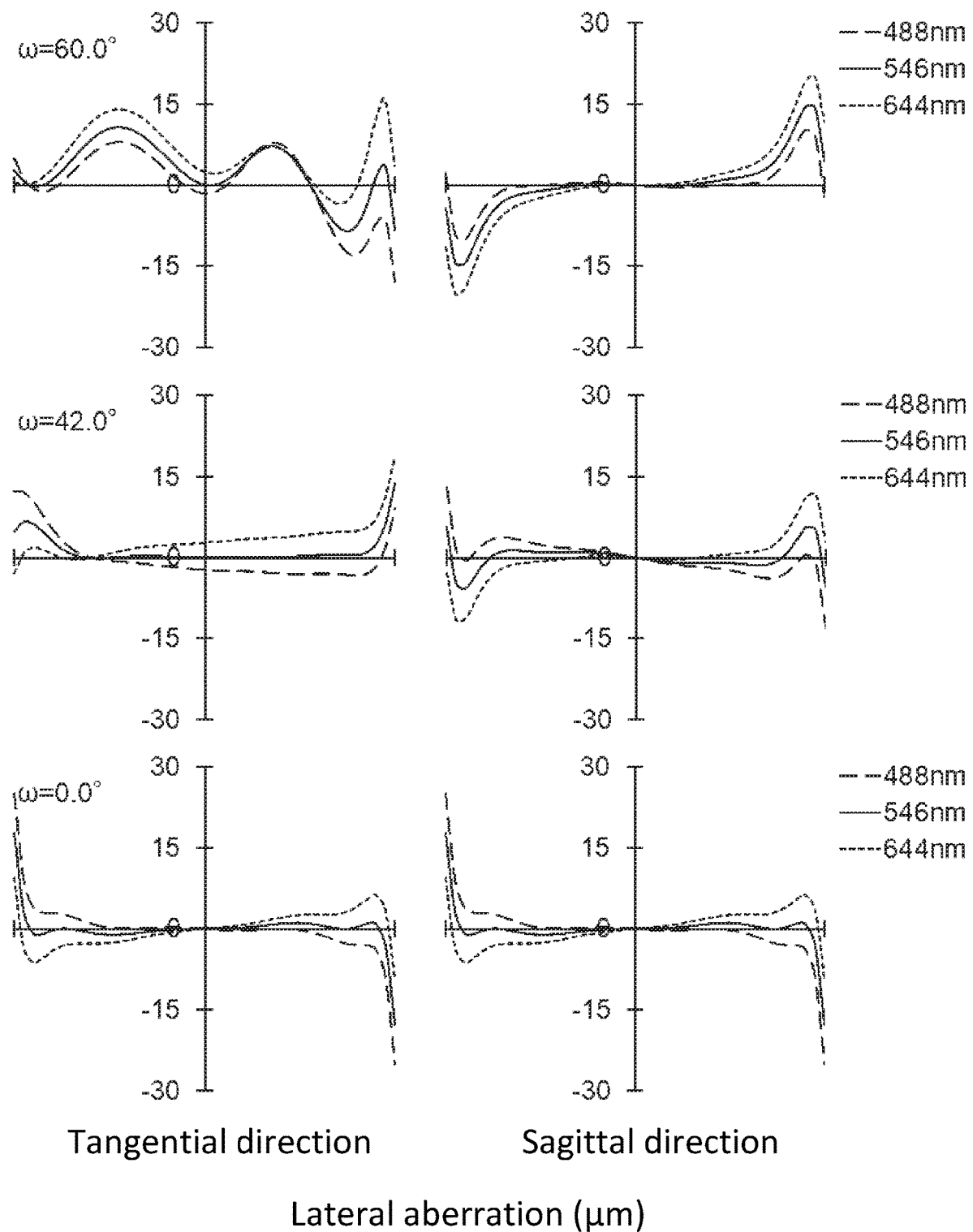
FIG. 17 is an aberration diagram showing a lateral aberration of the imaging lens of FIG. 16.
Figure 18:
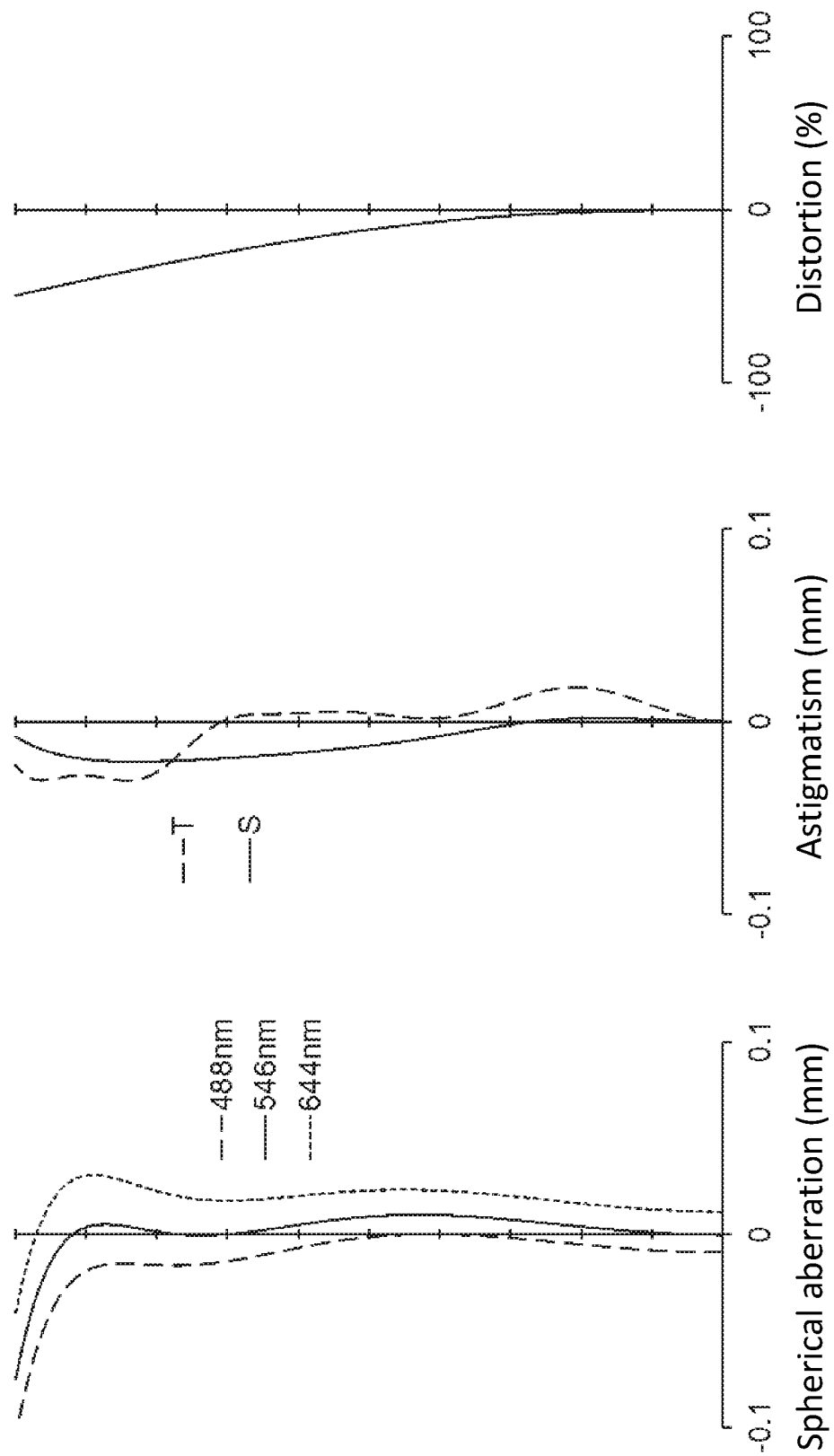
FIG. 18 is an aberration diagram showing a spherical aberration, astigmatism, and a distortion of the imaging lens of FIG. 16.
Figure 19:
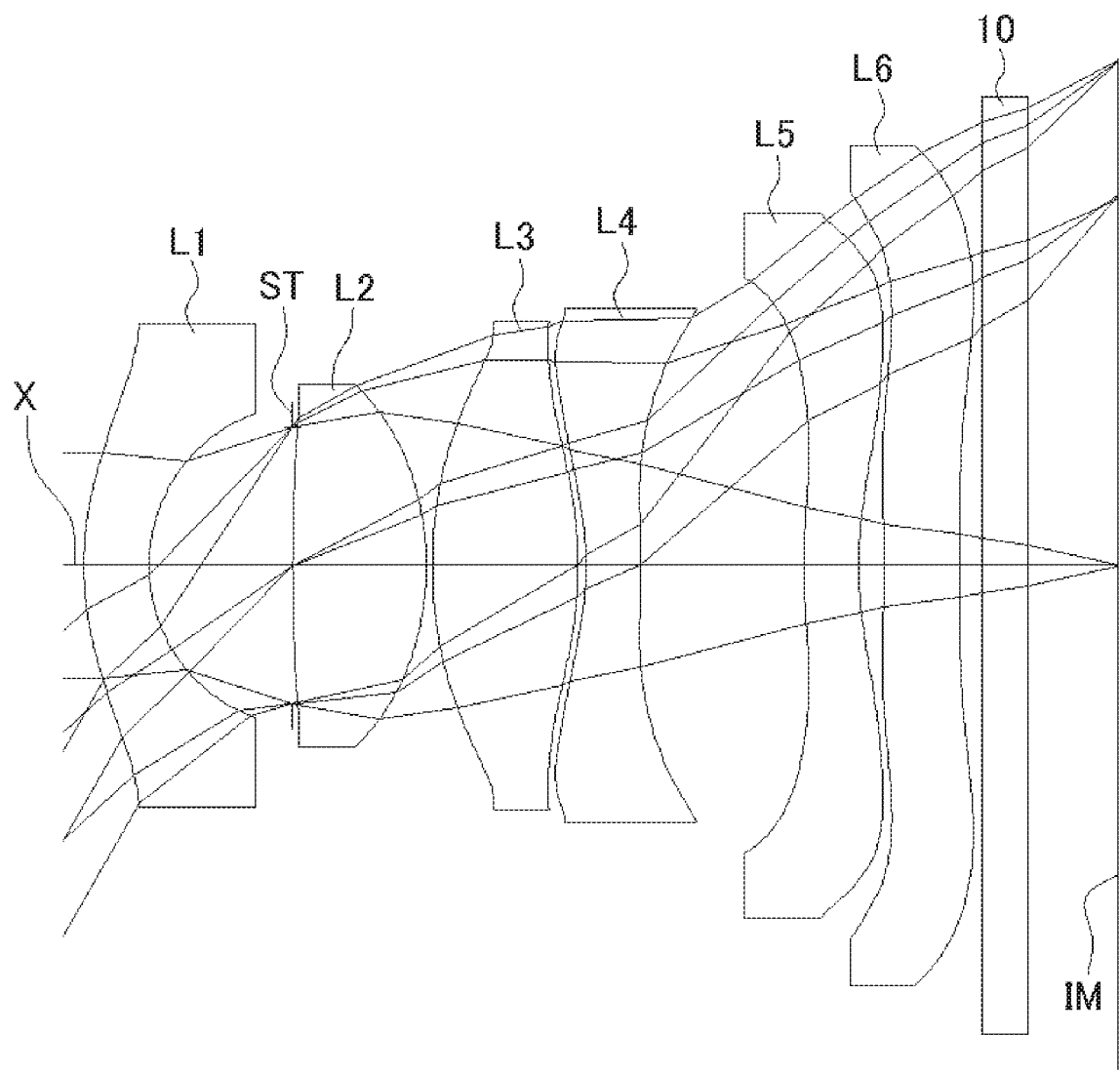
FIG. 19 is a sectional view showing a schematic configuration of an imaging lens in Numerical Data Example 7 of the present invention.

FIG. 17 shows a lateral aberration that corresponds to a half angle of view ω, and FIG. 18 shows a spherical aberration (mm), astigmatism (mm), and a distortion (%), respectively. As shown in FIGS. 17 and 18, according to the imaging lens of Numerical Data Example 6, the aberrations are satisfactorily corrected.

Numerical Data Example 7

Basic Lens Data

TABLE 13 f = 2.36 mm Fno = 2.1 ω = 60.0°

| | i | r | d | n | ν | [mm] |
|---|---|---|---|---|---|---|
| | | ∞ | ∞ | | | |
| L1 | 1* | 1.408 | 0.299 | 1.5371 | 59.7 | f1 = -3.286 |
| | 2* | 0.725 | 0.654 | (=D12) | | |
| ST | 3 | ∞ | 0.000 | | | |
| L2 | 4* | 9.059 | 0.610 | 1.5371 | 59.7 | f2 = 2.212 |
| | 5* | -1.335 | 0.028 | (=D23) | | |
| L3 | 6* | 2.040 | 0.663 | 1.5371 | 59.7 | f3 = 1.962 |
| | 7* | -1.931 | 0.038 | | | |
| L4 | 8* | -1.282 | 0.249 | 1.6689 | 21.9 | f4 = -2.890 |
| | 9* | -4.101 | 0.744 | (=D45) | | |
| L5 | 10* | 2.682 | 0.250 | 1.5371 | 59.7 | f5 = -8.991 |
| | 11* | 1.668 | 0.116 | (=D56) | | |
| L6 | 12* | -5.355 | 0.345 | 1.6689 | 21.9 | f6 = -8.469 |
| | 13* | -100.249 | 0.100 | | | |
| | 14 | ∞ | 0.210 | 1.5187 | 64.0 | |
| | 15 | ∞ | 0.414 | | | |
| (IM) | | ∞ | | | | |

F1 = 2.012 mm
F2 = -4.409 mm
f23 = 1.125 mm
E4 = 0.603 mm
T4 = 0.249 mm
T5 = 0.250 mm
T6 = 0.345 mm
Φ1A = 2.197 mm
Φ4B = 2.349 mm
Φ5A = 2.629 mm
Φ6B = 3.830 mm
L16 = 3.995 mm
La = 4.648 mm
Hmax = 4.108 mm
Dep = 1.120 mm

TABLE 14

| | | | | Aspherical surface data | | | | |
|---|---|---|---|---|---|---|---|---|
| i | k | A4 | A6 | A8 | A10 | A12 | A14 | A16 |
| 1 | 0.000E+00 | −1.308E−01 | −4.626E−02 | 0.000E+00 | 0.000E+00 | 0.000E+00 | 0.000E+00 | 0.000E+00 |
| 2 | 0.000E+00 | −1.268E−01 | 4.746E−02 | 0.000E+00 | 0.000E+00 | 0.000E+00 | 0.000E+00 | 0.000E+00 |
| 4 | 0.000E+00 | −8.456E−03 | 1.187E−01 | −3 366E−01 | 3.879E−01 | 0.000E+00 | 0.000E+00 | 0.000E+00 |
| 5 | 0.000E+00 | −2.579E−02 | 6.158E−03 | −3.372E−01 | 2.950E−01 | 0.000E+00 | 0.000E+00 | 0.000E+00 |
| 6 | 0.000E+00 | 3.409E−02 | 5.121E−03 | 1.884E−02 | −5.584E−02 | 0.000E+00 | 0.000E+00 | 0.000E+00 |
| 7 | 0.000E+00 | −3.420E−02 | 4.940E−01 | −4.674E−01 | 1.493E−01 | 0.000E+00 | 0.000E+00 | 0.000E+00 |
| 8 | 0.000E+00 | 6.914E−01 | −8.402E−01 | 6.402E−01 | −1.493E−01 | 0.000E+00 | 0.000E+00 | 0.000E+00 |
| 9 | 0.000E+00 | 7.434E−01 | −9.196E−01 | 5.477E−01 | 4.575E−02 | −2.037E−01 | 7.586E−02 | −7.733E−03 |
| 10 | 0.000E+00 | −4.619E−01 | 3.243E−01 | −7.935E−02 | 1.707E−02 | −8.580E−02 | 6.566E−02 | −1.514E−02 |
| 11 | 0.000E+00 | −3 811E−01 | 2.528E−01 | −1.274E−01 | 4.498E−02 | −1 447E−02 | 1.940E−03 | 4.905E−05 |
| 12 | 0.000E+00 | 3.455E−01 | −3.654E−01 | 1.768E−01 | −2.492E−02 | −1.415E−02 | 6.081E−03 | −6.664E−04 |
| 13 | 0.000E+00 | 1.459E−01 | −1.224E−01 | 3.579E−02 | −2.005E−03 | −1.361E−03 | 2.959E−04 | −1.786E−05 |

The values of the respective conditional expressions are as follows:

$D12/f = 0.277$ $D23/f = 0.012$ $D12/D23 = 23.4$ $f2/f3 = 1.127$ $f23/f = 0.477$ $f4/f = -1.225$ $D45/f = 0.315$ $D45/L16 = 0.186$ $\Phi 5A/\Phi 4B = 1.119$ $f6/f = -3.589$ $D56/f = 0.049$ $T5/T6 = 0.725$ $La/H \text{ max} = 1.131$ $f/\text{Dep} = 2.107$ Accordingly, the imaging lens of Numerical Data Example 7 satisfies the above-described conditional expressions.

Figure 20:
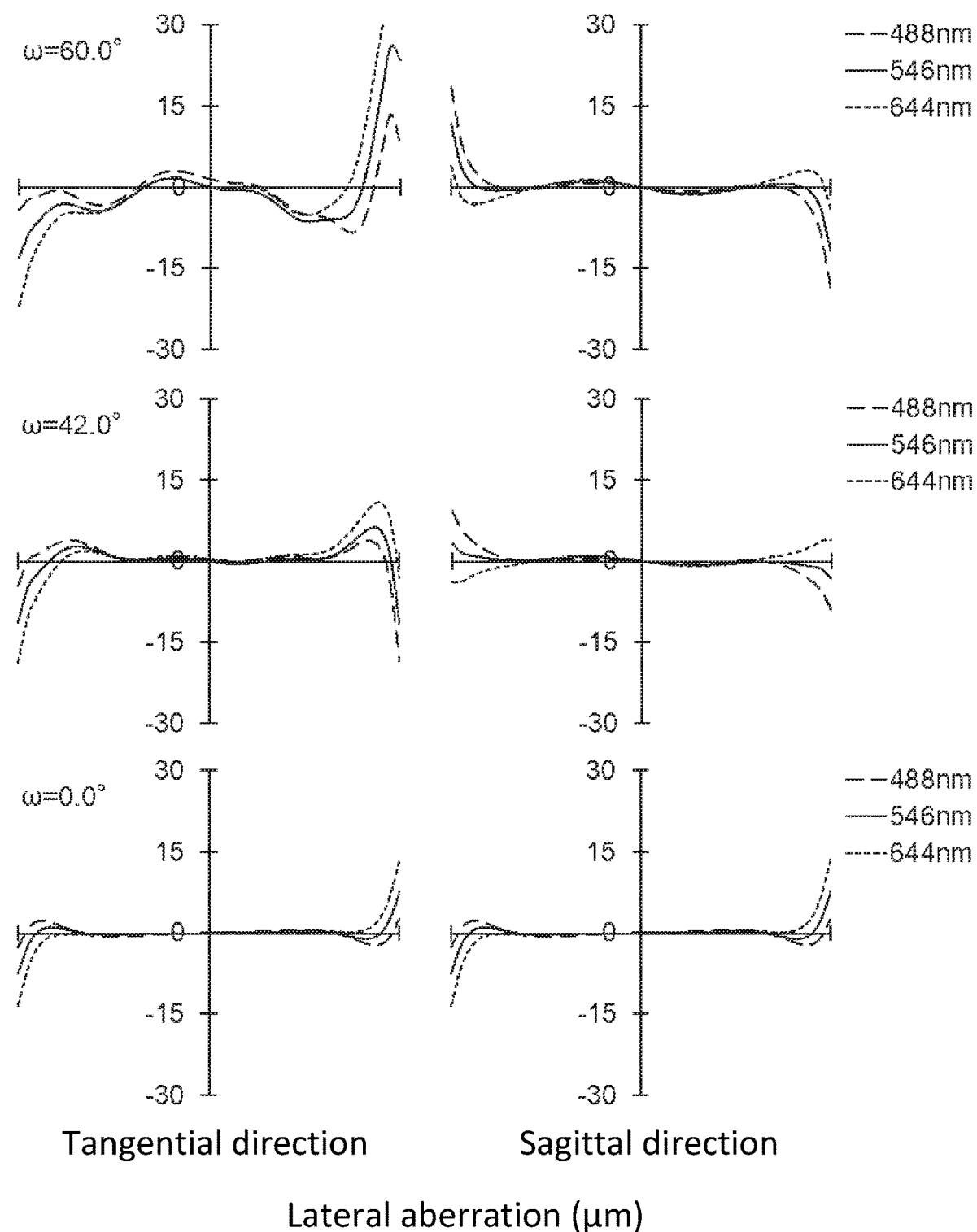
FIG. 20 is an aberration diagram showing a lateral aberration of the imaging lens of FIG. 19.
Figure 21:
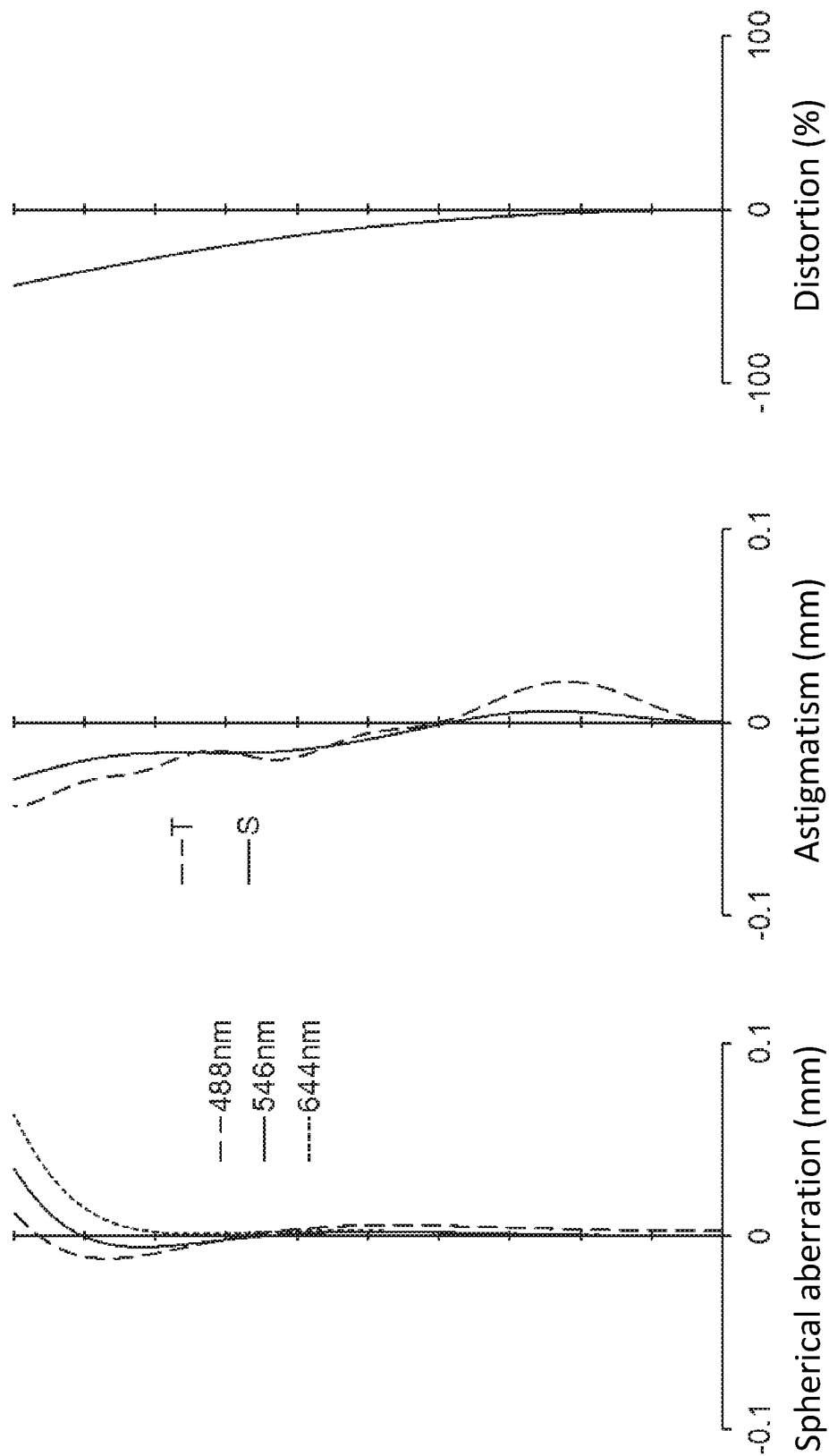
FIG. 21 is an aberration diagram showing a spherical aberration, astigmatism, and a distortion of the imaging lens of FIG. 19.

FIG. 20 shows a lateral aberration that corresponds to a half angle of view ω, and FIG. 21 shows a spherical aberration (mm), astigmatism (mm), and a distortion (%), respectively. As shown in FIGS. 20 and 21, according to the imaging lens of Numerical Data Example 7, the aberrations are satisfactorily corrected.

According to the embodiment of the present invention, the imaging lenses have very wide angles of view (2ω) of 100° or greater. According to the imaging lens of the embodiment, it is possible to take an image over a wider range than that taken by a conventional imaging lens, while having a small size.

According to the imaging lenses of the embodiment, the Fnos are as small as 2.1 to 2.5. According to the imaging lens of the embodiment, it is achievable to obtain a sufficiently bright image without providing the above-described electrical circuit to reduce noises in the imaging element.

Accordingly, when the imaging lens of the embodiment is mounted in an imaging optical system, such as onboard cameras, smartphones, digital cameras, digital video cameras, network cameras, TV conference cameras, fiberscopes, and capsule endoscopes, it is possible to attain both high performance and downsizing of the cameras.

Accordingly, the present invention is applicable to an imaging lens for mounting in a relatively small cameras, such as onboard cameras, smartphones and cellular phones, digital cameras, digital video cameras, network cameras, TV conference cameras, fiberscopes, and capsule endoscopes, it is possible to attain both high performance and downsizing of the cameras.

The disclosure of Japanese Patent Application No. 2017-237736, filed on Dec. 12, 2017, is incorporated in the application by reference.

While the present invention has been explained with reference to the specific embodiment of the present invention, the explanation is illustrative and the present invention is limited only by the appended claims.

What is claimed is:

1. An imaging lens comprising:
a first lens having negative refractive power;
an aperture stop;
a second lens;
a third lens;
a fourth lens having negative refractive power;
a fifth lens; and
a sixth lens, arranged in this order from an object side to an image plane side,
wherein said fifth lens is formed in a shape so that a surface thereof on the object side is convex at a paraxial region thereof,
said sixth lens is formed in a meniscus shape at a paraxial region thereof, and
said first lens has an Abbe's number ν1, and said sixth lens has an Abbe's number ν6, and said first lens is disposed away from the second lens by a distance D12 on an optical axis thereof so that the following conditional expressions are satisfied:

$40 < \nu 1 < 75$, $10 < \nu 6 < 40$, $0.05 < D12/f < 0.8$, where f is a focal length of a whole lens system.

2. The imaging lens according to claim 1, wherein said second lens is disposed away from the third lens by a distance D23 on an optical axis thereof so that the following conditional expression is satisfied:

$0.001<D23/f<0.3$, where f is a focal length of a whole lens system.

3. The imaging lens according to claim 1, wherein said first lens is disposed away from the second lens by a distance D12 on an optical axis thereof, and said second lens is disposed away from the third lens by a distance D23 on an optical axis thereof so that the following conditional expression is satisfied:

$2<D12/D23<30$.

4. The imaging lens according to claim 1, wherein said second lens and said third lens have a composite focal length f23 so that the following conditional expression is satisfied:

$0.2<f23/f<1$, where f is a focal length of a whole lens system.

5. The imaging lens according to claim 1, wherein said sixth lens has a focal length f6 so that the following conditional expression is satisfied:

$-5<f6/f<-0.5$, where f is a focal length of a whole lens system.

6. The imaging lens according to claim 1, wherein said fifth lens has a thickness T5 on an optical axis thereof and said sixth lens has a thickness T6 on an optical axis thereof so that the following conditional expression is satisfied:

$0.5<T5/T6<3.5$.

7. An imaging lens comprising:
a first lens having negative refractive power;
an aperture stop;
a second lens;
a third lens;
a fourth lens having negative refractive power;
a fifth lens; and
a sixth lens, arranged in this order from an object side to an image plane side,
wherein said third lens is formed in a shape so that a surface thereof on the object side is convex at a paraxial region thereof,
said fifth lens is formed in a shape so that a surface thereof on the object side is convex at a paraxial region thereof,
said sixth lens is formed in a meniscus shape at a paraxial region thereof, and
said sixth lens has an Abbe's number ν6, and said first lens is disposed away from the second lens by a distance D12 on an optical axis thereof so that the following conditional expressions are satisfied:

$10<ν6<40$, $0.05<D12/f<0.8$, where f is a focal length of a whole lens system.

8. The imaging lens according to claim 7, wherein said second lens is disposed away from the third lens by a distance D23 on an optical axis thereof so that the following conditional expression is satisfied:

$0.001<D23/f<0.3$, where f is a focal length of a whole lens system.

9. The imaging lens according to claim 7, wherein said first lens is disposed away from the second lens by a distance D12 on an optical axis thereof, and said second lens is disposed away from the third lens by a distance D23 on an optical axis thereof so that the following conditional expression is satisfied:

$2<D12/D23<30$.

10. The imaging lens according to claim 7, wherein said second lens and said third lens have a composite focal length f23 so that the following conditional expression is satisfied:

$0.2<f23/f<1$, where f is a focal length of a whole lens system.

11. The imaging lens according to claim 7, wherein said sixth lens has a focal length f6 so that the following conditional expression is satisfied:

$-5<f6/f<-0.5$, where f is a focal length of a whole lens system.

12. The imaging lens according to claim 7, wherein said fifth lens has a thickness T5 on an optical axis thereof and said sixth lens has a thickness T6 on an optical axis thereof so that the following conditional expression is satisfied:

$0.5<T5/T6<3.5$.

13. An imaging lens comprising:
a first lens having negative refractive power;
an aperture stop;
a second lens;
a third lens;
a fourth lens;
a fifth lens; and
a sixth lens, arranged in this order from an object side to an image plane side,
wherein said third lens is formed in a shape so that a surface thereof on the object side is convex at a paraxial region thereof,
said fourth lens is formed in a meniscus shape at a paraxial region thereof,
said fifth lens is formed in a shape so that a surface thereof on the object side is convex at a paraxial region thereof,
said sixth lens is formed in a meniscus shape at a paraxial region thereof, and
said sixth lens has an Abbe's number ν6, and said second lens and said third lens have a composite focal length f23 so that the following conditional expressions are satisfied:

$10<ν6<40$, $0.2<f23/f<1$, where f is a focal length of a whole lens system.

14. The imaging lens according to claim 13, wherein said first lens is disposed away from the second lens by a distance D12 on an optical axis thereof so that the following conditional expression is satisfied:

$0.05<D12/f<0.8$, where f is a focal length of a whole lens system.

15. The imaging lens according to claim 13, wherein said second lens is disposed away from the third lens by a distance D23 on an optical axis thereof so that the following conditional expression is satisfied:

$0.001<D23/f<0.3$, where f is a focal length of a whole lens system.

16. The imaging lens according to claim 13, wherein said first lens is disposed away from the second lens by a distance D12 on an optical axis thereof, and said second lens is disposed away from the third lens by a distance D23 on an optical axis thereof so that the following conditional expression is satisfied:

$2 < D12/D23 < 30.$

17. The imaging lens according to claim 13, wherein said sixth lens has a focal length f6 so that the following conditional expression is satisfied:

$-5 < f6/f < -0.5,$ where f is a focal length of a whole lens system.

* * * * *